US010357954B2

(12) United States Patent
Liebler

(10) Patent No.: US 10,357,954 B2
(45) Date of Patent: Jul. 23, 2019

(54) SEPARATING DEVICE FOR SEPARATING SECTIONS FROM A MATERIAL WEB, LAMINATING MACHINE COMPRISING A SEPARATING DEVICE, AND METHOD FOR LAMINATING A SHEET OF A MATERIAL WEB AND FOR SEPARATING AT LEAST ONE SECTION FROM A MATERIAL WEB

(71) Applicant: KOENIG & BAUER AG, Würzburg (DE)

(72) Inventor: Manfred Liebler, Erlenbach (DE)

(73) Assignee: Koenig & Bauer AG, Wurzburg (DE)

( * ) Notice: Subject to any disclaimer, the term of this patent is extended or adjusted under 35 U.S.C. 154(b) by 0 days.

(21) Appl. No.: 15/757,463

(22) PCT Filed: Nov. 3, 2016

(86) PCT No.: PCT/EP2016/076511
§ 371 (c)(1),
(2) Date: Mar. 5, 2018

(87) PCT Pub. No.: WO2017/076948
PCT Pub. Date: May 11, 2017

(65) Prior Publication Data
US 2018/0244031 A1    Aug. 30, 2018

(30) Foreign Application Priority Data

Nov. 4, 2015   (DE) .................. 10 2015 221 661

(51) Int. Cl.
*B32B 43/00*    (2006.01)
*B32B 37/22*    (2006.01)
(Continued)

(52) U.S. Cl.
CPC .............. *B32B 37/22* (2013.01); *B26D 1/405* (2013.01); *B26D 7/14* (2013.01); *B26D 7/1854* (2013.01);
(Continued)

(58) Field of Classification Search
CPC . B32B 37/0053; B32B 38/00; B32B 38/0004; B26F 3/00; B65H 1/263;
(Continued)

(56) References Cited

U.S. PATENT DOCUMENTS 3,542,267 A * 11/1970 Saburo ................... D01D 5/423
225/3
3,727,814 A * 4/1973 Kuckhermann ....... B65H 35/10
225/100
(Continued)

FOREIGN PATENT DOCUMENTS

DE        69203913 T2    4/1992
DE        19540148 C1    4/1997
(Continued)

OTHER PUBLICATIONS

Aug. 13, 2018 Office Action issued in Japanese Patent Application No. 2018-514998.

*Primary Examiner* — Mark A Osele
*Assistant Examiner* — Nickolas R Harm
(74) *Attorney, Agent, or Firm* — Mattingly & Malur, PC

(57) ABSTRACT

A separation device is usable for separating portions of a material web. The separation device has at least one front clamping device, with at least one front clamping point, and at least one rear clamping device, with at least one rear clamping point, and at least one first stretching element. The separation device can be switched between at least one traversing mode and at least one separation mode by the movement of at least the at least one first stretching device (Continued)

between at least one first traversing position and at least one first separation position. A transport line is the shortest connection between the at least one front clamping point and the at least one rear clamping point, that connection line completely on a vertical reference plane and traversing or running at a tangent to any component of the separation device on the respective same side as one of a transport path provided for the material web and the portions to be separated. The transport line, in the at least one separation mode, is 2 mm longer than in the at least one traversing mode and has the smallest radius of curvature in the at least one separation mode of at least 0.05 mm. A first reference plane and a second reference plane are mutually spaced apart in an axial direction and a first transport line, lying on the first reference plane, and a second transport line, lying on the second reference plane, have different lengths when the first stretching element is located in the at least one first separation position.

5 Claims, 12 Drawing Sheets

(51) Int. Cl.
| | | |
|---|---|---|
| B26D 1/40 | (2006.01) | |
| B26D 7/14 | (2006.01) | |
| B26D 7/18 | (2006.01) | |
| B32B 33/00 | (2006.01) | |
| B32B 37/00 | (2006.01) | |
| B26F 3/00 | (2006.01) | |
| B32B 38/00 | (2006.01) | |
| B32B 38/06 | (2006.01) | |
| B32B 3/18 | (2006.01) | |
| B65H 11/02 | (2006.01) | |
| B65H 35/04 | (2006.01) | |
| B65H 35/00 | (2006.01) | |
| B65H 1/26 | (2006.01) | |
| B65H 1/30 | (2006.01) | |
| B65H 3/08 | (2006.01) | |
| B65H 11/00 | (2006.01) | |
| B26F 3/06 | (2006.01) | |
| B26F 3/02 | (2006.01) | |
| B65H 35/10 | (2006.01) | |
| B32B 37/04 | (2006.01) | |
| B32B 37/10 | (2006.01) | |
| B32B 37/12 | (2006.01) | |
| B32B 38/18 | (2006.01) | |
| B32B 41/00 | (2006.01) | |
| B26D 1/00 | (2006.01) | |
| B42D 25/29 | (2014.01) | |
| B42D 25/45 | (2014.01) | |

(52) U.S. Cl.
CPC ............ *B26F 3/002* (2013.01); *B26F 3/06* (2013.01); *B32B 3/18* (2013.01); *B32B 33/00* (2013.01); *B32B 37/0053* (2013.01); *B32B 38/0004* (2013.01); *B32B 38/06* (2013.01); *B32B 38/145* (2013.01); *B65H 1/263* (2013.01); *B65H 1/30* (2013.01); *B65H 3/0816* (2013.01); *B65H 11/005* (2013.01); *B65H 11/02* (2013.01); *B65H 35/00* (2013.01); *B65H 35/04* (2013.01); *B26D 2001/0053* (2013.01); *B26D 2001/0093* (2013.01); *B26F 3/00* (2013.01); *B26F 3/02* (2013.01); *B32B 37/04* (2013.01); *B32B 37/10* (2013.01); *B32B 37/1207* (2013.01); *B32B 38/00* (2013.01); *B32B 38/1808* (2013.01); *B32B 38/1841* (2013.01); *B32B 38/1858* (2013.01); *B32B 38/1875* (2013.01); *B32B 41/00* (2013.01); *B32B 2041/04* (2013.01); *B32B 2309/105* (2013.01); *B32B 2309/14* (2013.01); *B32B 2309/72* (2013.01); *B32B 2429/00* (2013.01); *B42D 25/29* (2014.10); *B42D 25/45* (2014.10); *B65H 11/002* (2013.01); *B65H 35/10* (2013.01); *B65H 2301/5124* (2013.01); *B65H 2301/51514* (2013.01); *B65H 2403/943* (2013.01); *B65H 2404/2613* (2013.01); *B65H 2801/21* (2013.01)

(58) Field of Classification Search
CPC ........ B65H 1/30; B65H 11/02; B65H 11/002; B65H 35/00; B65H 35/04; B65H 35/10
USPC ............ 156/250, 494; 225/4, 5, 93, 97, 100, 225/103, 104, 105, 106; 270/52.12
See application file for complete search history.

(56) References Cited

U.S. PATENT DOCUMENTS

| | | | |
|---|---|---|---|
| 3,794,228 A | | 2/1974 | Colwill et al. |
| 4,285,513 A | * | 8/1981 | Kwasnitza ............... B65H 5/24 271/183 |
| 4,526,634 A | * | 7/1985 | Beer ..................... B32B 37/223 156/353 |
| 4,529,114 A | | 7/1985 | Casper et al. |
| 4,572,752 A | | 2/1986 | Jensen et al. |
| 4,704,171 A | | 11/1987 | Thompson et al. |
| 5,285,977 A | | 2/1994 | Biagiotti |
| 5,362,013 A | * | 11/1994 | Gietman, Jr. ........ B65H 19/267 242/521 |
| 5,427,294 A | * | 6/1995 | VandenHeuvel ...... B65H 35/10 225/100 |
| 5,518,569 A | | 5/1996 | Achilles et al. |
| 5,639,335 A | | 6/1997 | Achilles et al. |
| 5,865,082 A | | 2/1999 | Cote et al. |
| 5,934,534 A | | 8/1999 | Schmidt et al. |
| 5,964,389 A | | 10/1999 | Schmidt et al. |
| 5,967,011 A | | 10/1999 | Feldkamper et al. |
| 5,979,729 A | | 11/1999 | Schmidt et al. |
| 6,068,170 A | | 5/2000 | Yamaguchi et al. |
| 6,170,371 B1 | | 1/2001 | Cote et al. |
| 6,253,819 B1 | | 7/2001 | Frendle et al. |
| 6,786,995 B2 | | 9/2004 | Frendle et al. |
| 7,128,793 B2 | | 10/2006 | Haldner et al. |
| 2002/0153093 A1 | | 10/2002 | Cook |
| 2004/0221947 A1 | * | 11/2004 | Haldner ................ B32B 37/223 156/250 |
| 2013/0221150 A1 | * | 8/2013 | Morelli ................ B65H 19/267 242/522 |

FOREIGN PATENT DOCUMENTS

| | | |
|---|---|---|
| DE | 19731364 A1 | 3/1998 |
| DE | 19983168 T1 | 11/1999 |
| DE | 20319208 U1 | 4/2004 |
| DE | 10356028 A1 | 6/2005 |
| DE | 69733501 T2 | 5/2006 |
| DE | 2020005021655 U1 | 4/2009 |
| DE | 102009058334 A1 | 6/2011 |
| DE | 102010037592 A1 | 3/2012 |
| DE | 102012112000 A1 | 10/2013 |
| EP | 165824 B1 | 12/1985 |
| EP | 235790 A2 | 9/1987 |
| EP | 586642 B1 | 3/1993 |
| EP | 1764329 A2 | 3/2007 |
| EP | 2383117 A1 | 11/2011 |
| GB | 1188589 A | 10/1970 |
| JP | H04-85032 A | 3/1992 |
| JP | H05-278925 A | 10/1993 |
| JP | 2006-151675 A | 6/2006 |

(56) References Cited

FOREIGN PATENT DOCUMENTS

| | | |
|---|---|---|
| WO | 2001087599 A1 | 11/2001 |
| WO | 2008061379 A1 | 5/2008 |
| WO | 2013072078 A1 | 5/2013 |
| WO | WO2015147262 A1 | 1/2015 |

* cited by examiner

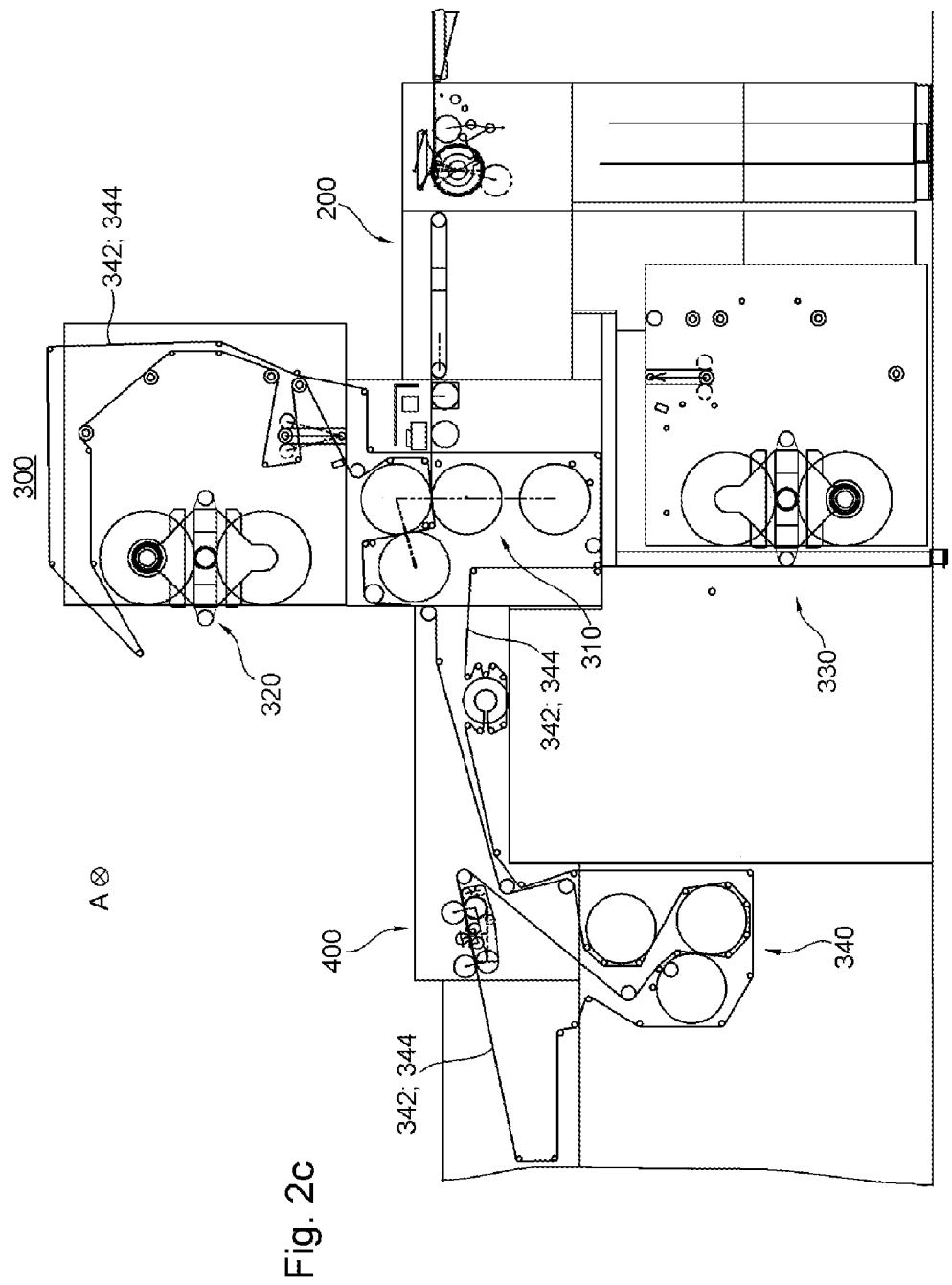

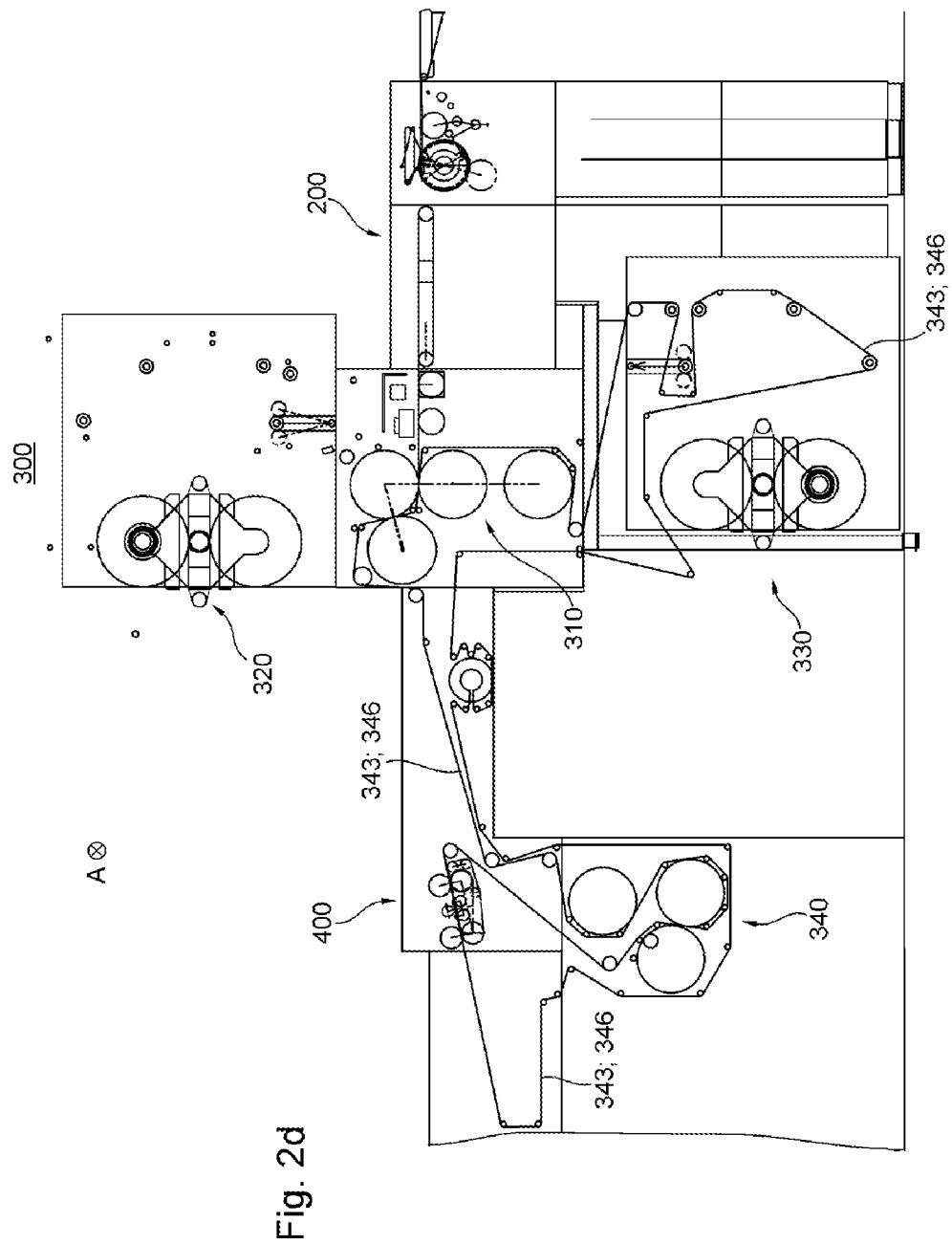

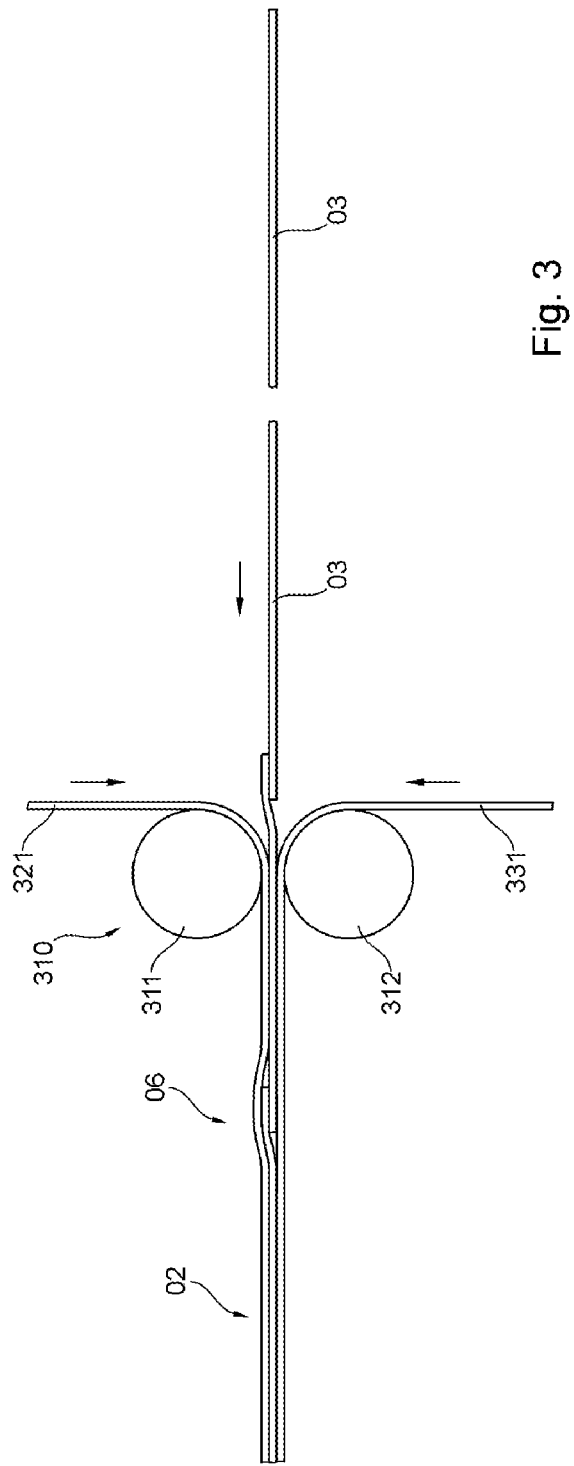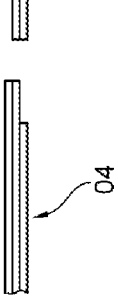
Fig. 3
Fig. 4b
Fig. 4a

SEPARATING DEVICE FOR SEPARATING SECTIONS FROM A MATERIAL WEB, LAMINATING MACHINE COMPRISING A SEPARATING DEVICE, AND METHOD FOR LAMINATING A SHEET OF A MATERIAL WEB AND FOR SEPARATING AT LEAST ONE SECTION FROM A MATERIAL WEB

CROSS REFERENCE TO RELATED APPLICATIONS

This application is the U.S. National Phase, under 35 U.S.C. § 371, of PCT/EP2016/076511, filed Nov. 3, 2016; published as WO2017/076948A2 and A3 on May 11, 2017, and claiming priority to DE 10 2015 221 661.6, filed Nov. 4, 2015, the disclosures of which are expressly incorporated herein by reference in their entireties.

FIELD OF THE INVENTION

The present invention relates to a separating device for separating sections from a material web, and to a laminating machine comprising a separating device, and to a method for laminating sheets of a material web and for separating at least one section from a material web.

BACKGROUND OF THE INVENTION

A device in which individual sheets are arranged in a shingled arrangement and are provided together with an additional coating is known from WO 2015/147262 A1.

A device by means of which a material web is separated into sections at perforated points is known from DE 697 33501 T2. In that case, rods are moved linearly or by pivoting movements in a plane the surface normal of which corresponds to the direction of transport of the material web. The rods thus move exclusively orthogonally to the material web.

DE 692 03 913 T2 discloses a separating device for separating perforated paper, in which the paper is held by friction on the lateral surface of a roller.

DE 20 2005 021 655 U1 and DE 197 31 364 A1 each disclose a cutting device for cutting paper webs.

DE 10 2009 058 334 A1 discloses a laminating machine having a separating device.

WO 2008/061379 A1 discloses a laminating machine which is modular in construction and includes a lamination source for laminating material.

U.S. Pat. No. 6,536,497 B2 discloses a laminating machine by means of which sheets can be laminated on two sides. One roll of laminating material is provided for each side.

EP 1 764 329 A2 discloses a processing machine in which printing substrate is unwound from a roll and cut into sheets, and is then processed, for example laminated. A reel changer may be provided for unwinding the printing substrate.

DE 103 56 028 A1 discloses a reel changer for a printing machine.

A device for laminating paper webs is known from EP 0 235 790 B1. Said device comprises a simple roll unwinder with web tension control for the laminating material.

A laminating device for laminating hollow bodies using laminating material is known from DE 10 2012 112 000 A1. In said device, a plurality of sensors is used for controlling web tension, among other things. A control mechanism is provided for monitoring the edge.

A laminating device for laminating a web in which the web tension of the laminating material is adjusted by means of a dancer roller is known from EP 0 165 824 B1.

A laminating machine having a sheet feeder is known from DE 10 2010 037 592 A1. Said document discloses either singulating the sheets or placing them in a shingled arrangement. Based on this arrangement, a corresponding material web is then produced.

EP 2 383 117 A1 discloses a laminating machine having a sheet feeder. Said document discloses arranging the sheets either edge-to-edge or in a shingled fashion. Based on this arrangement, a corresponding material web is then produced.

EP 0 586 642 B1 discloses a laminating machine having a sheet feeder. Said document discloses either separating the sheets or arranging them edge-to-edge or in a shingled fashion. Based on this arrangement, a corresponding material web is then produced.

A laminating machine for laminating sheet-type material is known from WO 01/87599 A1. Said document discloses creating a laminated material web from individual sheets by means of a web-type laminating material, and then generating individual sheets from the material web by a separation extending over its entire width.

A device with which a web-type material is provided with shaped pieces of a laminating material is known from DE 199 83 168 T1. Shapes are punched out of a web-type laminating material in a continuous process, and the resulting waste is removed. The punched-out shapes are then applied to the web-type material.

U.S. Pat. Nos. 6,068,170 A and 3,794,228 A each disclose a separating device for paper, in which a separating element is lowered from above in an oblique position onto a material web, so that a separation of the material web begins on one side and advances transversely over the material web until the material web is separated. All movements of the separating element proceed within a vertical plane, which runs transversely to the transport direction of the material web. The separating element is tilted multiple times.

U.S. Pat. No. 4,529,114 A discloses a separating device in which a stretching element is rotatable about an axis that extends parallel to an axial direction. A web can be clamped by two clamping points, and then stretched by means of the stretching element until it tears. The clamping points are opened up periodically.

A cutting device is known from DE 203 19 208 U1, the blade of which is arranged rotatably about an axis, and which has counter-holders and lowering devices, with which a material web can be pressed against the blade. A rectilinear connection between the counter-holders and/or the lowering devices then intersects the blade, and the web is tensioned sufficiently to be cut.

A method for producing solar panels is known from WO 2013/072078 A1. In said method, a film is held securely in place by vacuum pressure, and is then provided with holes by means of a punching process, after which it is laminated to other layers. The film itself can also consist of a plurality of laminated layers.

SUMMARY OF THE INVENTION

The object of the invention is to devise a separating device for separating sections from a material web, and a laminating machine comprising a separating device, and a method for laminating sheets of a material web and for separating at least one section from a material web.

The object is achieved according to the invention by the provision of a separating device for separating sections from a material web. The separating device has at least one forward clamping device, with at least one forward clamping point, and at least one rear clamping device, with at least one rear clamping point, and also has at least one first stretching element. By moving at least the at least one first stretching element between at least one first traversing position and at least one first separation position, the separating device can be switched between at least one first traversing mode and at least one separation mode. A transport line is the shortest connection between the at least one forward clamping point and the at least one rear clamping point, that shortest connection lying entirely within a vertical reference plane and traversing or forming a tangent to any component of the separating device on the respective same side as a transport path which is provided for one of the material web and the sections. In the at least one separation mode, the transport line is at least 2 mm longer than in the at least one traversing mode. In the at least one separation mode, the transport line has a minimum radius of curvature of at least 0.05 mm. A first reference plane and a second reference plane are arranged spaced from one another in an axial direction. When the first stretching element is in the at least one first separation position, a first transport line lying in the first reference plane and a second transport line lying in the second reference plane have different lengths.

The separating device may also have at least one second stretching element which is movable between a second traversing position and a second separation position. The separating device may also have at least one third stretching element which is movable between a third traversing position and a third separation position. When the first stretching element is in the first separation position, and the second stretching element is in the second separation position, and the third stretching element is in the third separation position, at least one rectilinear connection between the at least one second stretching element and the at least one third stretching element intersects the at least one first stretching element.

The present invention also includes a laminating machine which comprises at least one laminating device and the at least one separation device for separating sections from a material web. The laminating machine comprises at least one laminating device and at least one separating device, as discussed above.

In a method for laminating sheets of a material and for separating at least one section from a material web, the sheets are fed to a laminating unit of a laminating machine, where they are laminating by bonding to at least one laminating material and are joined to produce a material web. The material web is securely clamped in at least one forward clamping point of the at least one forward clamping device. The material web is also securely clamped in at least one rear clamping point of the at least one rear clamping device. The transport line is provided as the shortest connection between the at least one forward clamping point and the at least one rear clamping point, with the connection lying entirely within a vertical reference plane and traversing or forming a tangent to any component of the separating device on the respective same side as one of the material web and the at least one section. At least one first stretching element is moved through a first traversing position to a first separation position, thereby stretching the transport line far enough that the at least one section of the material web tears off.

The separating device has at least one supporting cylinder having at least a first cylinder channel. The separating device also has at least one stretching cylinder, which cooperates with the supporting cylinder, and which carries the at least one stretching element and has at least one second cylinder channel. The separating device further has at least one first clamping cylinder, which has at least one first clamping protrusion that, together with the supporting cylinder, forms the forward clamping device. The separating device also has at least one second clamping cylinder, which has at least one second clamping protrusion that, together with the supporting cylinder, forms the rear clamping device in at least one clamping position.

A method is disclosed for separating at least one section from a material web. The material web is securely clamped in the at least one forward clamping point of the at least one forward clamping device. The material web is securely clamped in the at least one rear clamping point of the at least one rear clamping device. The transport line is the shortest connection between the at least one forward clamping point and the at least one rear clamping point, with that connection lying entirely within a vertical reference plane and traversing or forming a tangent to any component of the separating device on one of the respective same side as the material web and the at least one section. The at least one first stretching element is moved from a first traversing position to a first separation position, thereby stretching the transport line far enough that the at least one section of the material web tears off.

One advantage consists, in particular, in that sections can be separated from a material web in a particularly simple, precise, and rapid manner during a running operation, without creating waste, which would increase the risk of malfunction of the processing machine. Precision is preferably promoted by two clamping devices and optionally an individual orientation of sheets.

One advantage consists, for example, in that a particularly rapid and trouble-free lamination operation is made possible. This is achieved, for example, by the use of web-type laminating material and more preferably by the use of reel changers for unwinding the laminating material. In particular, the start of a lamination operation is simplified by the provision of a disposal unit for laminating material, for example, because this enables production to be started quickly and easily without removing laminating material manually from hard-to-reach areas.

One advantage consists, for example, in that a particularly high degree of precision in the application of the laminating material can be achieved. This is achieved, for example, by the use of web edge aligners and/or a web tension controller during infeed of the laminating material. Alternatively or additionally, a particularly precise alignment of sheets to be laminated is accomplished, for example, by singulating and/or aligning the sheets, and/or by placing the sheets in a shingled arrangement relative to one another.

One advantage consists, for example, in that the lamination of sheets can be particularly precise and in that the sheets and/or sections are not damaged during the process, for example by approaching blades or by incomplete lamination.

One advantage consists, for example, in the provision of at least one lamination monitoring device, since the proper lamination of sheets and production of a material web can then be monitored. This enables a rapid response to detected faults, for example, by stopping the separating device and/or the laminating machine. In this way, waste can be avoided and the risk of damage to the separating device and/or the laminating machine can be reduced.

One advantage consists, for example, in the provision of at least one separation sensor device, as this enables a rapid response to the faulty separation of a section of a material web, for example by stopping the separating device and/or the laminating machine. In this way, waste can be avoided and the risk of damage to the separating device and/or the laminating machine can be reduced.

One advantage consists, for example, in the provision of at least one webbing-up means for laminating material. The laminating machine can then reach operational readiness particularly quickly and precisely, for example after a restart or after a brief interruption in production. This facilitates handling, especially with the two-sided lamination of the material.

One advantage consists, for example, in the provision of at least one thickness monitoring device for monitoring the transport path of the material web. This enables shingling to take place in a controlled manner and/or enables separation to be carried out with particular precision, and/or enables malfunctions that might be caused by connection points in webs of laminating material to be avoided. The result is increased production quality and lower susceptibility to errors.

BRIEF DESCRIPTION OF THE DRAWINGS

Exemplary embodiments of the invention are illustrated in the set of drawings and will be described in greater detail below.

Shown are:

FIG. 2*c* a schematic illustration of the detail of FIG. 2*b* with a first webbing-up means, arranged along a first webbing-up path;

FIG. 2*d* a schematic illustration of the detail of FIG. 2*b* with a second webbing-up means, arranged along a second webbing-up path;

FIG. 3. a schematic illustration of a joining of sheets and laminating materials to form a material web;

FIG. 4*a* a schematic illustration of a material web after joining and before separation;

FIG. 4*b* a schematic illustration of the leading end of a material web and the trailing end of a separated section;

DESCRIPTION OF PREFERRED EMBODIMENTS

Figure 1:
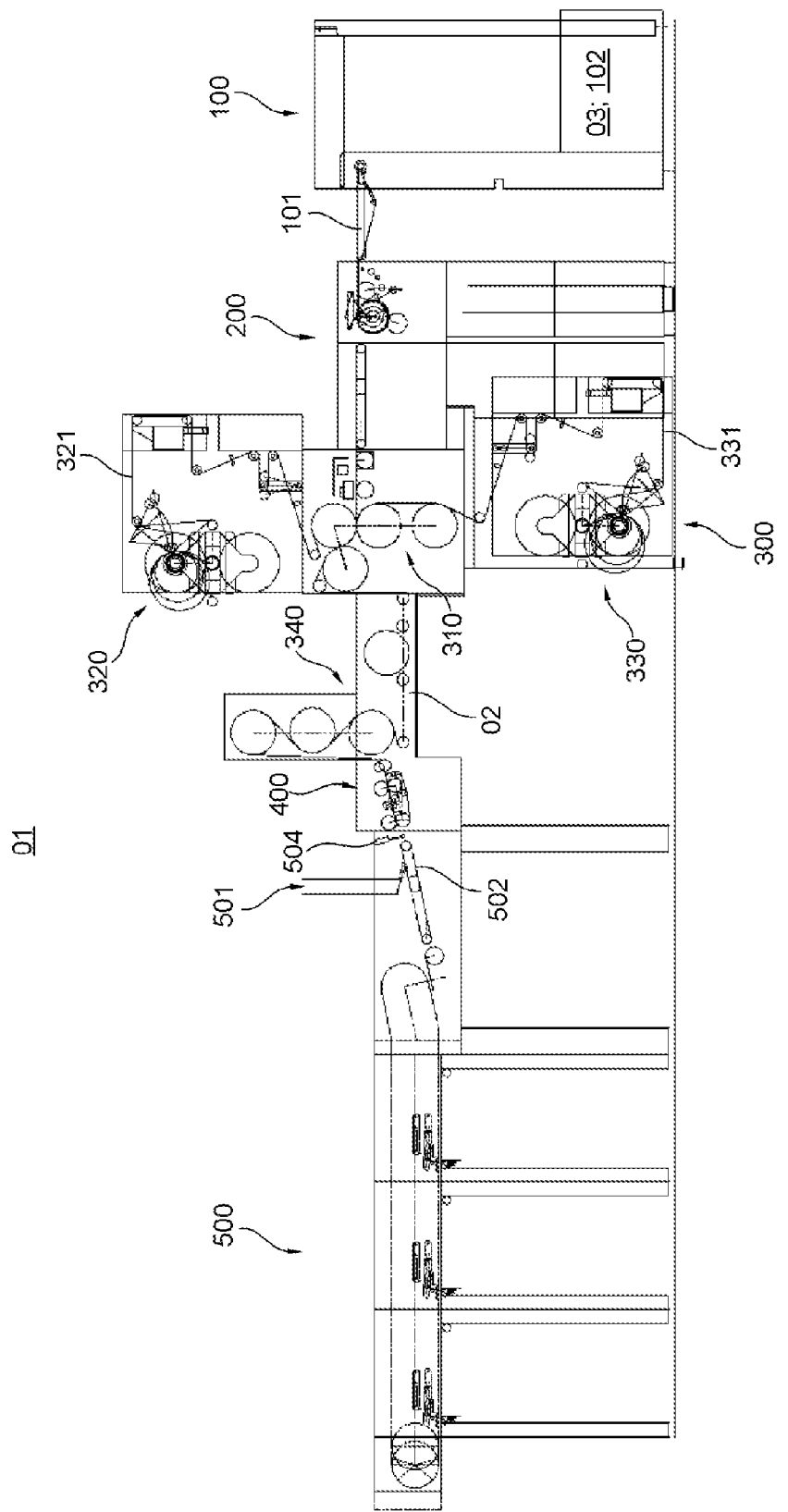
FIG. 1 a schematic illustration of a processing machine comprising a laminating unit and a separating device.
Figure 2A:
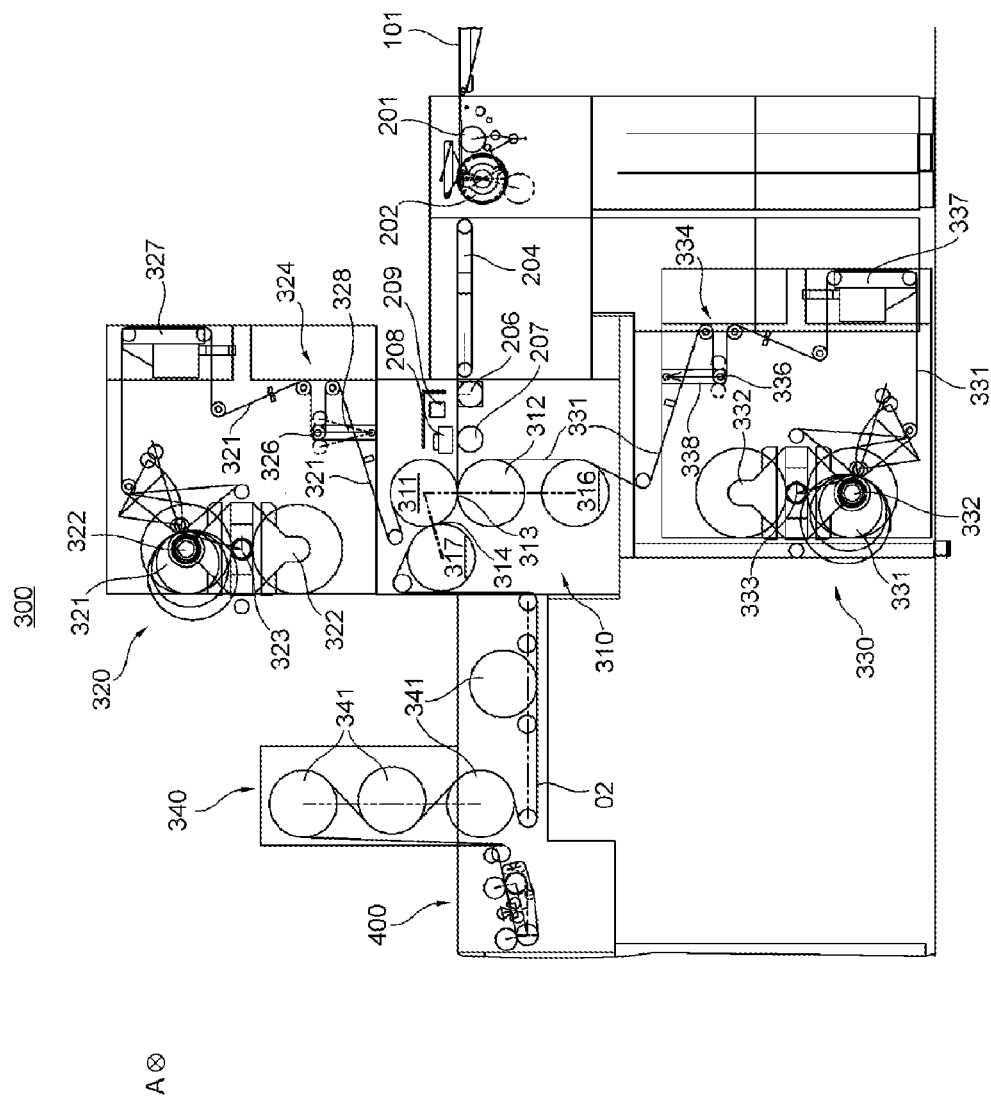
FIG. 2*a* a schematic illustration of a detail of FIG. 1.
Figure 2B:
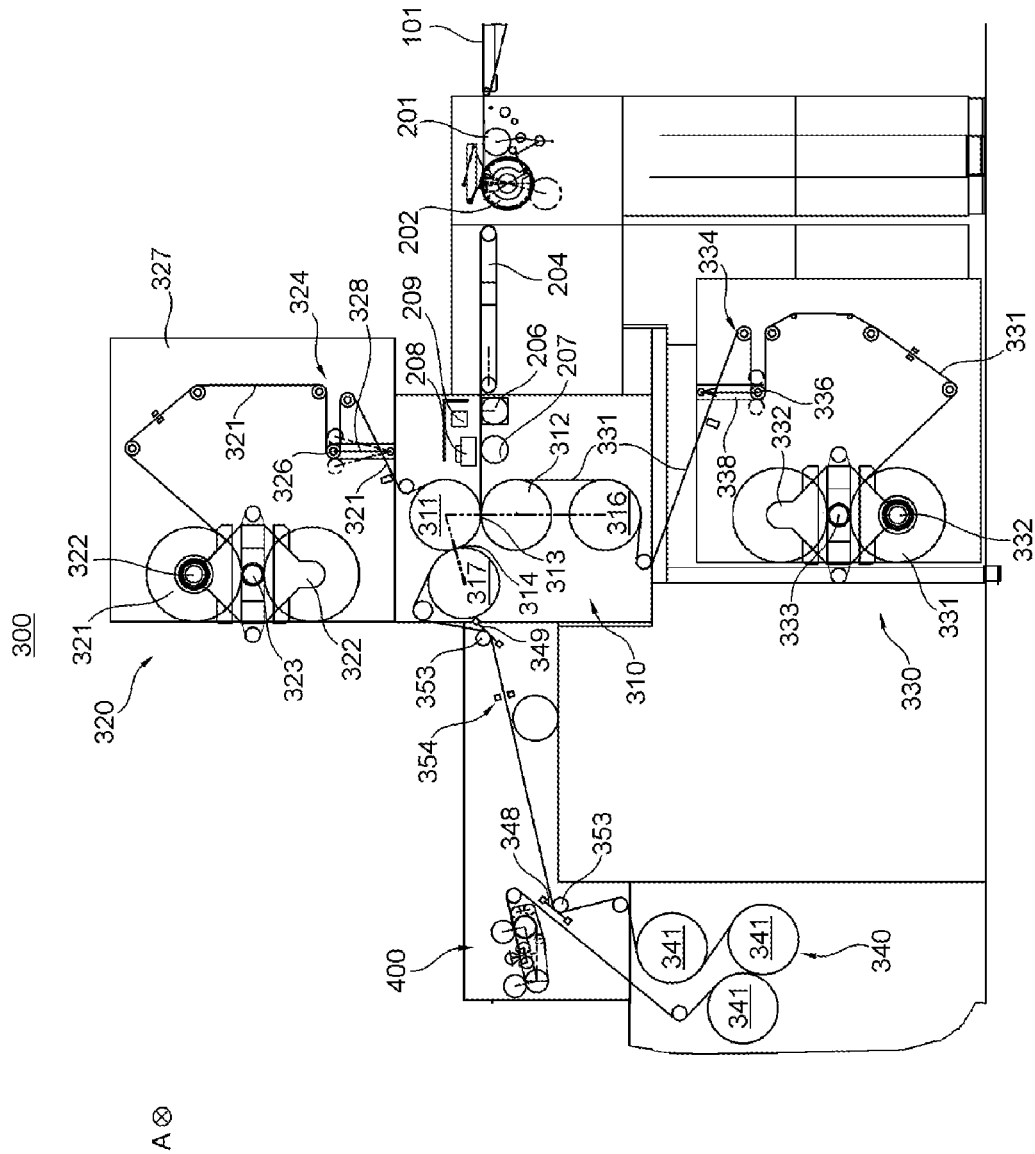
FIG. 2*b* a schematic illustration according to FIG. 2*a* with an alternative web run.
Figure 5:
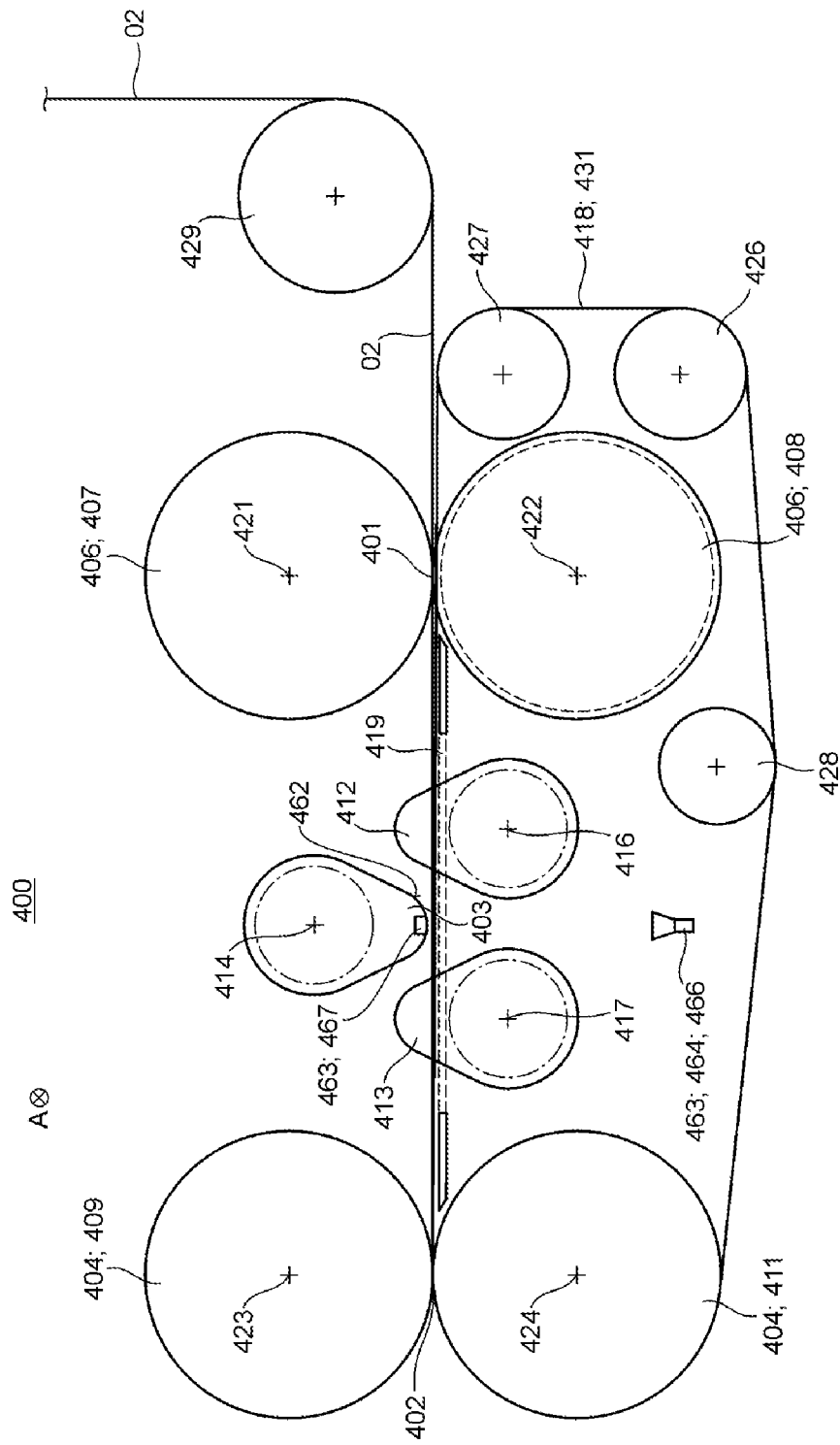
FIG. 5 a schematic illustration of a first embodiment of a separating device.
Figure 6:
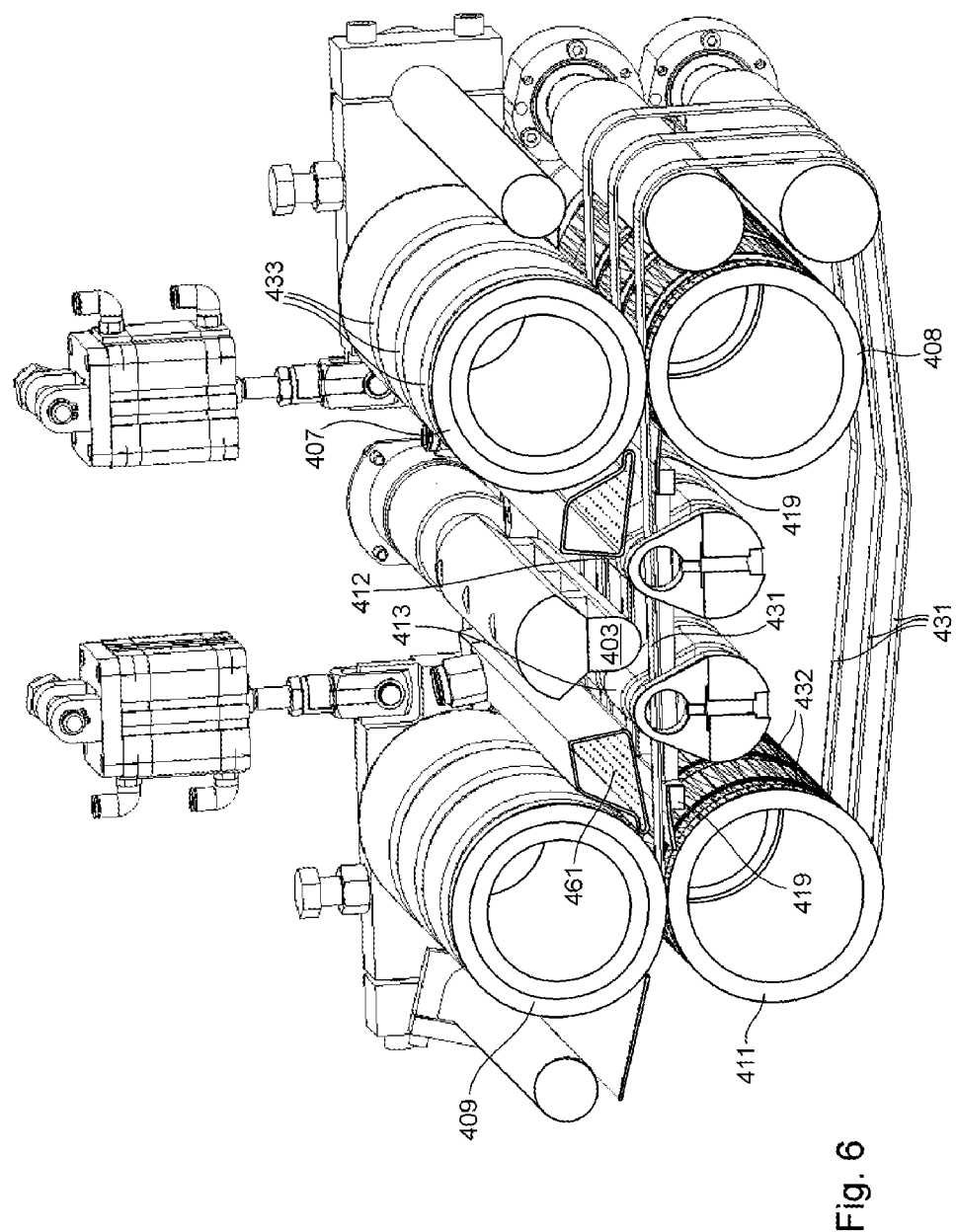
FIG. 6 a schematic illustration according to FIG. 5 from an oblique perspective.
Figure 7:
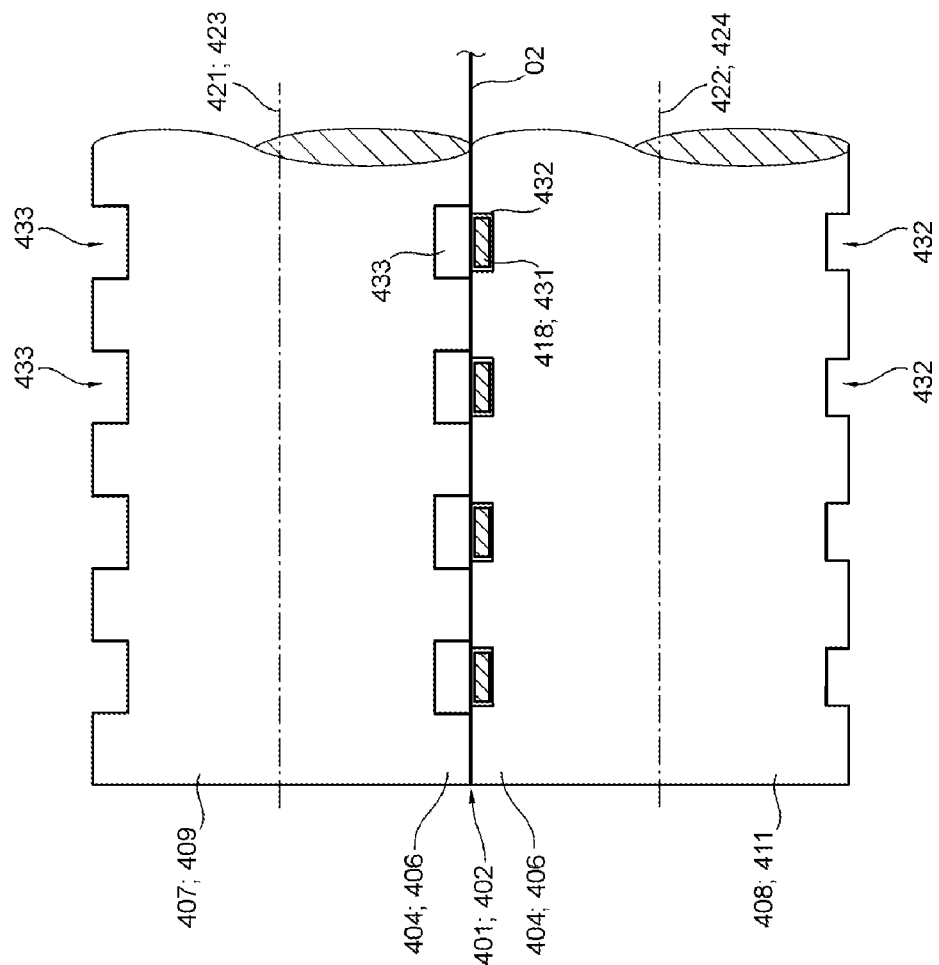
FIG. 7 a schematic illustration of a draw roller and a pressing roller according to FIG. 5.
Figure 8:
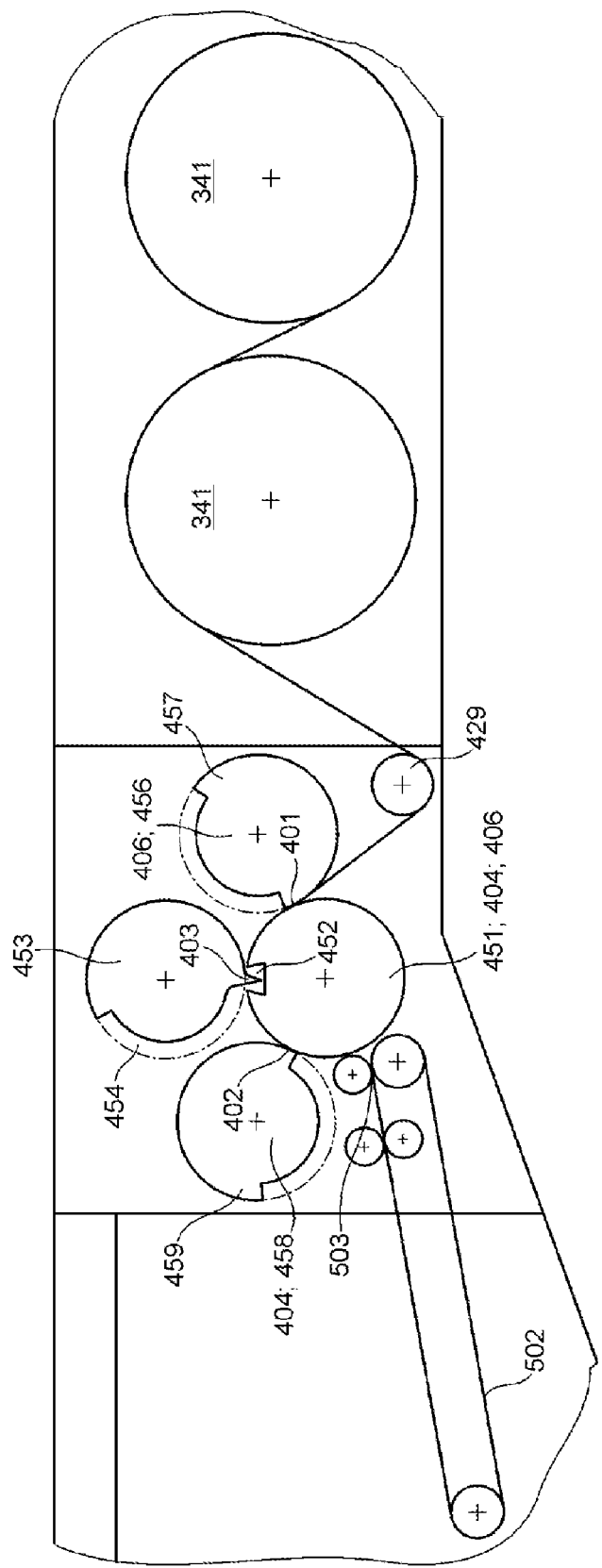
FIG. 8 a schematic illustration of a second embodiment of a separating device.
Figure 9:
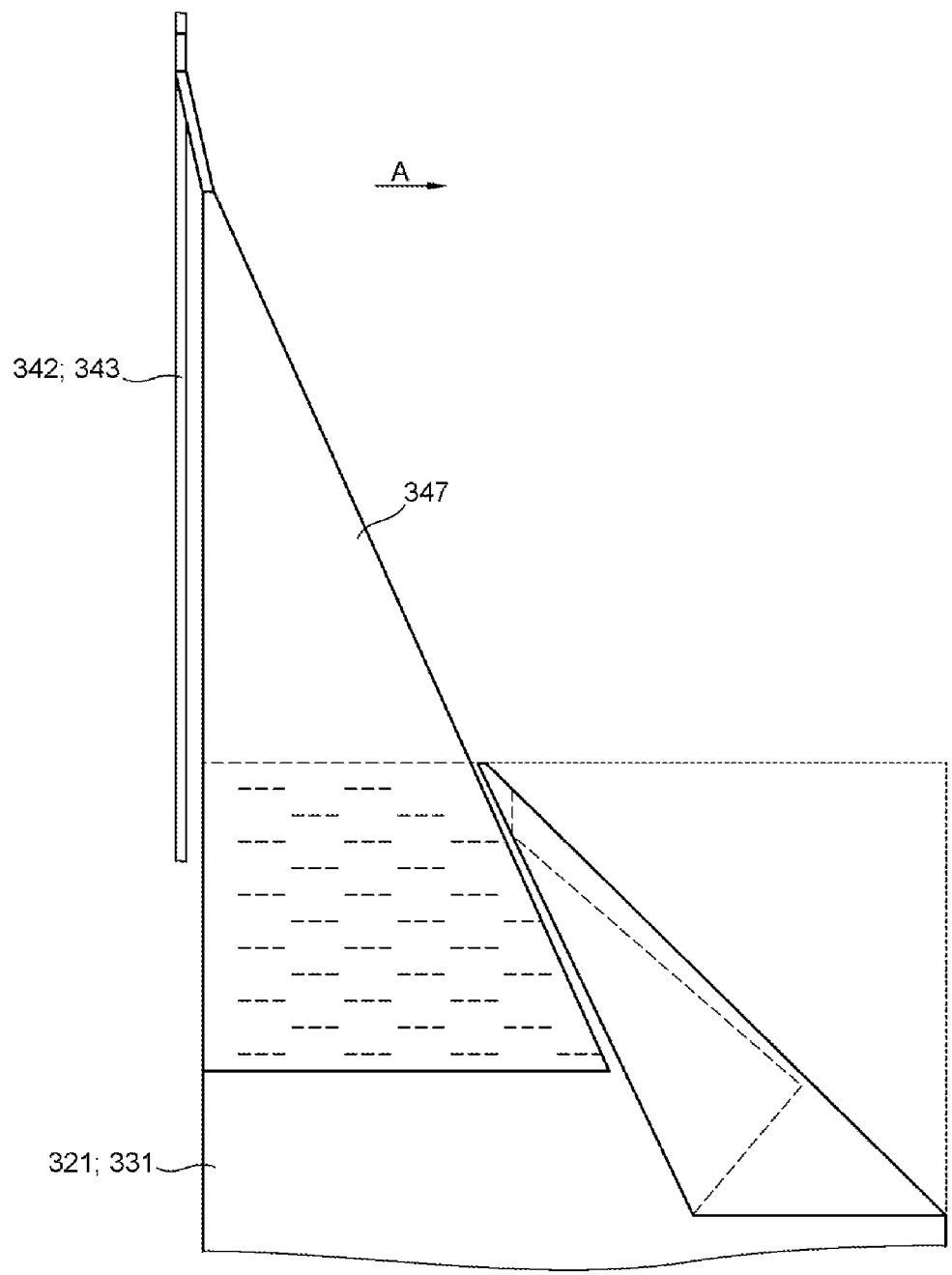
FIG. 9 a schematic illustration of a webbing-up means, a connecting element, and a laminating material.
Figure 10:
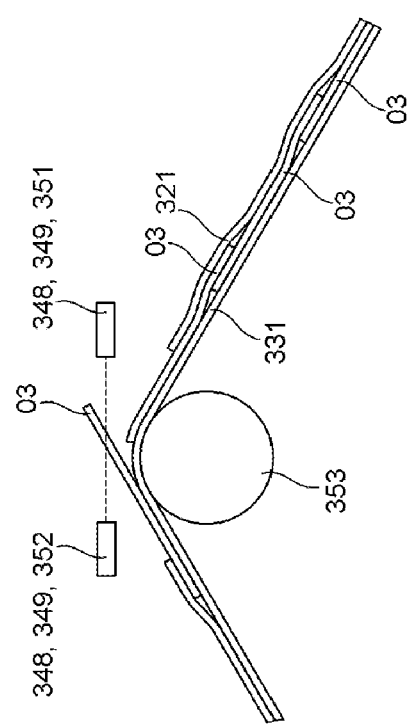
FIG. 10 a schematic illustration of a lamination monitoring device.

A processing machine 01 preferably comprises at least one separating device 400. Processing machine 01 is pref- erably embodied as a laminating machine 01. Processing machine 01 is, in particular, a processing machine 01 for processing flat material 02; 03, for example, sheet-type flat material 03 and/or web-type flat material 02. Preferably, processing machine 01 is a laminating machine 01 for sheet-type material 03. During processing by means of processing machine 01, for example, flat material 02; 03 is not in web form for the entire time and/or at every location, and is not in sheet form for the entire time and/or at every location. Flat material 02; 03 is preferably transformed from a web-type state to a sheet-type state in at least one separation process. This occurs in a separating device 400, for example. Processing machine 01 preferably comprises at least one such separating device 400. More preferably, previously flat material 03 is transformed from a sheet-type state to a material web 02, i.e. to flat material 02 in a web-type state. This is carried out in a joining device 310, for example, preferably embodied as a laminating unit 310. Processing machine 01 preferably comprises at least one such joining device 310, more preferably embodied as at least one laminating unit 310. The at least one laminating unit 310 is preferably a laminating unit 310 for producing a laminated material web 02.

The non-laminated material 02, in particular the non-laminated sheets 03, are preferably printed and/or embossed and/or coated. The non-laminated material 02, in particular the non-laminated sheets 03, preferably comprise paper and/or cardboard and/or paperboard and/or textile fabric and/or cotton and/or carbon-based plastic as components.

A material web 02 is preferably understood in this context as an already laminated material web 02. Web-type material that is not yet laminated is referred to as non-laminated material web 02. If the material is already in web form prior to lamination, it preferably has predetermined separation points. These can be introduced in processing machine 01 or in a prior processing operation. Material that has been separated from material web 02 is referred to as section 04. Sheet-type material that is not yet laminated is referred to as non-laminated sheets or simply as sheets. When sheets 03 are connected to form a material web 02, predetermined separation points are created in the resulting connecting regions. Processing machine 01 preferably serves to laminate sheets 03, i.e. to cover sheets with at least one layer of at least one laminating material 321; 331. This is preferably carried out on at least one side and more preferably on both sides. Laminating material 321; 331 and/or the rolls that carry laminating material 321; 331 preferably have an extension or width in axial direction A that is equal to the width of material 02 and/or sheet 03 and/or material web 02, and/or that preferably amounts to at least 500 mm, more preferably at least 700 mm, and even more preferably at least 800 mm. The width or extension of laminated material web 02 measured in axial direction A is preferably constant along this entire laminated material web 02 and/or is preferably as great as the greater of the dimension of sheets 03 in axial direction A and the dimension of laminating material 321; 331 in axial direction A. More preferably, the dimension of sheets 03 in axial direction A and the dimension of laminating material 321; 331 in axial direction A are the same size, and the dimension of laminated material web 02 in this axial direction A is also the same size.

Axial direction A is preferably a direction that is oriented horizontally. Axial direction A is preferably oriented orthogonally to every transport direction of material web 02. Axial direction A is preferably oriented parallel to a rotational axis of a component of processing machine 01, for example a rotational axis 421; 423 of a pressing roller 407;

409 and/or a rotational axis 422; 424 of a draw roller 406; 408 and/or at least one stretching axis 414; 416; 417 of at least one stretching element 403; 412; 413.

Processing machine 01 preferably has at least one material source 100, in particular embodied as at least one material source 100 for material 02 to be laminated. The at least one material source 100 is preferably embodied as at least one sheet feeder 100, and/or the at least one material source 100 serves to feed sheet-type material 02, in particular non-laminated sheets 03, into processing machine 01. Alternatively, with an appropriate configuration of processing machine 01, non-laminated or already laminated web-type material 02 may be fed in for processing. In that case, the at least one material source 100 is embodied, for example, as at least one roll unwinding device 100 for unwinding at least one material roll.

Material source 100, and in particular sheet feeder 100, is embodied, for example, in a manner customary for a sheet feeder 100. For example, sheet feeder 100 comprises a conveyor line 101 embodied as a belt feed table 101 and a printing substrate bundle 102 embodied as a sheet pile 102, for example, which is located in particular on a loading device, for example a pile board. The pile board is preferably connected to transport means, which ensure that the top of sheet pile 102 is held in a defined position. Sheet feeder 100 preferably includes sheet singulating elements and sheet transport elements. The sheet singulating elements are embodied as separating suckers, for example, and the sheet transport elements are embodied as transport suckers, for example, and are preferably together part of a feeder head. The drive for the feeder head is preferably configured such that the separating suckers execute a predominantly vertical movement and the transport suckers execute a predominantly horizontal movement in or opposite the sheet transport direction. Separate drives are preferably provided for the separating suckers and the transport suckers. Separate drives are understood here as controllable drives, which are assigned to one working element or to a group of working elements for the purpose of driving them, in particular for driving them independently of the driving of other working elements or groups of working elements, in particular without being coupled via a mechanical and/or positive drive connection to drives of other working elements that are driven individually or likewise in one or more groups.

To avoid having to stop processing machine 01 in order to change out sheet pile 102, sheet feeder 100 is preferably equipped with a nonstop system. This nonstop system is equipped, in particular, with an auxiliary pile carrier, embodied, in particular, as a rake, a roller rack, or a board, which can be transported into the region of sheet pile 102 and is disposed on a slide-in unit. The auxiliary pile carrier preferably receives the residual pile, which is resting on a transport base, in particular a pallet, and preferably lifts the pile continuously to ensure the fault-free singulation and removal of the topmost sheet 03 of the residual pile in each case. During this time, the new pile, which is disposed on an additional pallet, for example, is preferably moved in, and the residual pile is then combined with the new pile.

Belt feed table 101, which is disposed downstream of sheet pile 102, is embodied, for example, as a suction-belt feed table 101. Said feed table preferably has at least two rollers, for example one drive roller and at least one deflecting roller, between which an integral or multipart conveying surface can be provided, for example, which is formed, for example, by an integral or multipart table top or by a suction module that forms the table top. The drive roller and the deflecting roller are preferably wrapped by at least one conveyor belt, which in the case of a suction-belt feeder table 101 is embodied as a suction belt. The belt is preferably tensioned with the aid of a tensioning roller and is preferably driven by an individual belt drive acting on the drive roller, for example, within a working cycle, following a speed profile. Corresponding with the drive roller are preferably timing rollers, which are controlled against the drive roller within a working cycle.

Processing machine 01 preferably has at least one preparation unit 200. Preparation unit 200 is embodied, for example, as a singulating unit 200; 202 and/or as an alignment unit 200 and/or as an overlapping unit 200; 206; 207; 208, in particular as a shingling unit 200, or has at least one singulating unit 200; 202 and/or at least one alignment unit 200 and/or at least one shingling unit 200; 206; 207; 208. Preparation unit 200 is also referred to as sheet infeed 200. A singulating unit 200 serves in particular for singulating sheets 03, in particular to such an extent that each sheet 03 is spaced by a distance from the sheets 03 immediately adjacent to it. At least one singulating unit 200; 202 is therefore preferably provided for spatially separating non-laminated sheets 03 from one another. Spatial separation is understood, in particular, as a state in which there is no direct physical contact. Processing machine 01 thus preferably comprises at least one singulating unit 200; 202 for spatially separating non-laminated sheets 03 from one another, and at least one shingling unit 200; 206; 207; 208 for placing non-laminated sheets 03 in a shingled arrangement relative to one another, said unit being disposed in particular downstream of the at least one singulating unit 200; 202 along a designated transport path for material 02. A shingling unit 200 can be omitted if a non-laminated material web 02 will be laminated and then separated into sections 04. In the following, however, it should be assumed that non-laminated sheets 03 will be combined to form a material web 02, and this material web 02 will then be divided into individual sections 04. The individual sections 04 preferably correspond to the previously infed sheets 03, with lamination added.

Preparation unit 200 has, for example, at least one first suction drum 201 embodied as stop drum 201. Preparation unit 200 further preferably has side marks and/or front lay cover marks and/or front stops, in particular for bringing the sheets 03 into a desired position in a controlled and precise manner. Preparation unit 200 preferably comprises at least one additional suction drum 202, in particular a second suction drum, which is embodied, for example, as an acceleration drum 202 and/or which serves to transfer sheets 03 to at least one suction belt 204. At least the at least one suction belt 204 preferably serves to transport sheets 03 that have been singulated, in particular spatially separated from one another. These sheets 03 are preferably singulated to allow each individual sheet 03 to be aligned precisely and independently of other sheets 03. Additionally, the identification of potential double sheets is facilitated. Singulation is preferably accomplished by positive acceleration and subsequent deceleration of a leading sheet 03 and/or by deceleration and subsequent positive acceleration of a trailing sheet 03. Singulating unit 200 therefore preferably comprises at least two independently operable drives. For example, the first suction drum 201 embodied as stop drum 201 is and/or can be driven by means of a different drive from the at least one second suction drum 202 embodied, for example, as acceleration drum 202, and/or from the at least one suction belt 204.

Preparation unit 200 preferably includes at least one underfeed drum 206. The at least one underfeed drum 206 is a component of shingling unit 200, for example. The at least one underfeed drum 206 preferably serves to accelerate sheets 03 briefly to an increased speed and then decelerate them again in order to reduce and/or close a gap between a sheet and the sheet 03 preceding it, and/or to move a subsequent sheet 03 forward far enough that it overlaps with a preceding sheet 03. To achieve a targeted overlap, at least one lifting device 207; 208 is preferably provided, which is embodied, for example, as a mechanical component 207 that lifts from below and/or as at least one blow nozzle 207 and/or as at least one suction nozzle 208. Such a mechanical component 207 that lifts from below has, for example, at least one eccentrically rotatable component 207 and at least one drive, in particular an independent drive, and is more preferably embodied as a clapper roller 207. Depending on the format of the sheet 03 to be processed, the mechanical component 207 that lifts from below, in particular the eccentrically rotatable component 207, is always conveyed straight upward such that it lifts the trailing end of a sheet 03 and preferably transfers it to an upper suction device 208. The at least one lifting device 207; 208 preferably serves to lift the trailing end of a leading sheet 03, in particular such that the leading end of a subsequent sheet 03 can be pushed underneath this trailing end of the sheet 03 preceding it. To support the lifting movement and/or to extend the time during which the trailing end of the sheet 03 is raised, at least one upper suction device 208 is provided, for example. Lifting device 207; 208 is thus preferably adaptable to different sheet lengths.

The at least one shingling unit 200 preferably includes the at least one lifting device 207; 208. The at least one lifting device 207; 208 preferably has at least one suction nozzle 208, the at least one opening of which has at least one downward directed component. The at least one suction nozzle 208 is preferably surrounded by at least one guide surface, which more preferably has additional suction openings 208, which even more preferably likewise have openings, each having at least one downward directed component. At least one transport surface, in particular for supporting sheets 03 as long as and in locations where suction nozzle 208 does not lift sheets 03, is preferably disposed opposite the at least one suction nozzle 208. This transport surface preferably has openings to enable pressure equalization and thereby facilitate lifting of at least portions of the sheets 03. The at least one suction nozzle 208 is preferably arranged opposite the at least one mechanical component 207 that lifts from below, in particular the at least one clapper roller 207. This at least one mechanical component 207 that lifts from below is preferably disposed for operation at variable speeds. This enables leading sheets 03 to be lifted in a sequence of movements adapted to their length. The at least one mechanical component 207 that lifts from below, and in particular the at least one clapper roller 207, is preferably a component of shingling unit 200.

In particular, this enables at least one process operation for laminating sheets 03 of a material 02, wherein the sheets 03 are preferably first separated from one another spatially by means of a singulating unit 200; 202, and wherein the sheets 03 are aligned, and wherein the sheets 03, in particular once they have been separated from one another spatially, are moved, in particular in pairs, by means of a shingling unit 200; 206; 207; 208 into a position in which they overlap one another only partially, and wherein the sheets 03 are fed to a laminating unit 310 of a laminating machine 01, where they are laminated in the mutually overlapping position by bonding to at least one laminating material 321; 331, and are joined to form a material web 02. In particular, the sheets 03 are preferably brought, in particular in pairs, into the partially mutually overlapping position in that the trailing end of the leading sheet 03 in each case is lifted, and the leading end of the respective trailing sheet 03 is then conveyed beneath the trailing end of the respective leading sheet 03 by increasing the transport speed of the respective trailing sheet 03 as compared with the transport speed of the leading sheet 03, thereby or preferably thereafter bringing the respective trailing end of each leading sheet 03 in contact with the leading end of the trailing sheet 03 in each case. Preferably by that time at the latest, the transport speed of the respective leading sheet 03 is again identical to the transport speed of the respective trailing sheet 03. The respective trailing end of a sheet 03 is preferably lifted as a result of contact with a correspondingly moving mechanical component 207 that lifts from below, in particular the clapper roller 207. Alternatively or additionally, the respective trailing end of a sheet 03 is preferably lifted by suction applied by means of at least one suction nozzle 208.

Processing machine 01 preferably comprises at least one laminating device 300. Laminating device 300 is preferably the device 300 that serves to augment the flat material 02 with at least one additional layer of material and, in particular, to produce a laminated material web 02, which more preferably is provided with predetermined separation points. Such a predetermined separation point is produced, for example, wherever two adjacent sheets 03 face one another, whether at a distance, or with end face contact, or with an overlap, as is preferred. Preparation unit 200 preferably transfers a continuous stream of non-laminated sheets 03, in particular arranged slightly overlapping, to laminating device 300. In laminating device 300, this stream is covered on at least one side and preferably on both sides with at least one layer of a laminating material 321; 331. This results, in particular, in an overlap area 06, in which two sheets 03 are touching one another. In this area, each of these two sheets 03 is in contact on only one side at most with the at least one laminating material 321; 331. The at least one laminating material 321; 331 forms the connection between the sheets 03. Cutting through the at least one layer of laminating material 321; 331 separates the sections 04 from one another. Since the layer of laminating material 321; 331 is preferably embodied as relatively thin, this overlap area 06 preferably represents a predetermined separation point. Overstretching the material web 02 causes, in particular, an overstretching of the layer of laminating material 321; 331 in the overlap area. A relatively small absolute overstretching of the material web 02 causes a substantial overstretching of the laminating material 321; 331 in the overlap area, whereas practically no stretching occurs in the area that is attached to the sheets 03.

Laminating device 300 itself preferably comprises at least one laminating unit 310. The at least one laminating unit 310 preferably serves to apply laminating material 321; 331 to the flat material 02. When flat material 02 is discussed in the foregoing and/or in the following, this should be understood in particular to include the material 02 that comes from material source 100 and is provided in the at least one laminating unit 310 with at least one additional layer of laminating material 321; 331, and is then preferably separated into individual sections 04. More particularly, flat material 02 is the material 02 that is surface-finished by the processing machine 01, while laminating material 321; 331 is the material that effects the surface-finishing of the flat material 02. Laminating material 321; 331 originates in particular from a lamination source 320; 330 and is preferably fed to the flat material 02. Laminating material 321; 331 is supplied, for example, in the form of at least one web, in particular at least one film, and is joined to the material 02 by pressing and/or heating.

Laminating device 300 itself preferably has at least one first lamination source 320 for laminating material 321 and/or at least one second lamination source 330 for laminating material 331. The at least one first lamination source 320 is preferably embodied as at least one upper lamination source 320, and/or the at least one first lamination source 320 preferably serves to apply a first laminating material 321 to a first side of material web 02 and/or sheets 03. The at least one second lamination source 330 is preferably embodied as at least one lower lamination source 330, and/or the at least one second lamination source 330 preferably serves to apply a second laminating material 331 to a second side of material web 02 and/or sheets 03, in particular opposite the first side of material web 02 and/or sheets 03. Laminating device 300 itself preferably has at least one cooling unit 340.

The at least one first lamination source 320 is preferably embodied as a first roll unwinding device 320 and/or preferably has at least one first roll-holding station 322. The first lamination source 320 is more preferably embodied as at least one first reel changer 320 and/or preferably has at least two first roll-holding stations 322, in particular for simultaneously supporting at least two rolls of the first laminating material 321. These first roll-holding stations 322 are preferably arranged pivotably, in particular jointly, about a common first pivot axis 323. The positions of the two first roll-holding stations 322 can preferably be exchanged by a common pivoting movement. The first roll unwinding device 320, which is embodied as a first reel changer 320, enables a flying reel change, for example, i.e. the joining of a new web of laminating material 321 to a web of laminating material 321 that has already been largely unwound, without stopping the webs. Preferably, however, processing machine 01 is stopped in order to change the infeed of laminating material 321 to a new roll. Nevertheless, this is carried out very quickly due to the embodiment as a first reel changer 320.

The at least one first lamination source 320 preferably has at least one first web edge aligner 327, which serves, in particular, to align laminating material 321 in axial direction A. The at least one first web edge aligner 327 is preferably a first web edge aligner 327 exclusively for aligning laminating material 321. The at least one first web edge aligner 327 has, for example, at least two alignment rollers, preferably arranged inside a movable frame, and these rollers can be used to adjust the axial position of the first laminating material 321, in particular, by adjusting their position in space. Preferably, the at least one first web edge aligner 327 can be used to change the alignment with respect to axial direction A of laminating material 321 downstream of the at least one first web edge aligner 327 as viewed in the transport direction, in particular without changing the position of the associated roll of laminating material 321 with respect to axial direction A. Alternatively, the position, in particular, of the first laminating material 321 with respect to axial direction A is adjusted, in particular controlled or regulated, by displacing the associated roll of laminating material 321 with respect to axial direction A. The at least one first lamination source 320 preferably has at least one first web tension controller 324, which has, for example, at least one first dancer roller 326 and/or at least one first dancer lever 328. At least one first roll supplying unit is provided, for example, by means of which rolls of laminating material 321 can be supplied to the first roll unwinding device 320. The at least one first roll supplying unit is embodied, for example, as at least one crane and/or as at least one lifting device and/or as at least one transporting cart and/or as at least one track system.

The at least one first roll unwinding device 320 has two support arms per roll holding station 322, for example, each of which more preferably has a clamping shaft bearing, preferably embodied as a bearing cap. The at least one first roll unwinding device 320 has, for example, at least one clamping shaft on which rolls of laminating material 321 can be received and held by means of carrier elements embodied as clamping jaws. At least one clamping shaft bearing preferably has a locking element, which in the case of a bearing cap is preferably pivotable about a locking axis. The clamping shaft, together with the roll of laminating material 321, is inserted with its two ends into the two clamping shaft bearings. Each of the two clamping shaft bearings is then closed, preferably by pivoting the locking element into a closed position. Only when the clamping shaft bearing is in an angular position that lies within this permissible angular position range can the respective clamping shaft bearing be opened.

The at least one second lamination source 330 is preferably embodied as a second roll unwinding device 330 and/or preferably has at least one second roll holding station 332. More preferably, the second lamination source 330 is embodied as at least one second reel changer 330 and/or preferably has at least two second roll holding stations 332, in particular for carrying at least two rolls of second laminating material 331 simultaneously. These second roll holding stations 332 are preferably arranged pivotably, in particular jointly, about a common second pivot axis 333. The positions of the two second roll holding stations 332 can preferably be exchanged by a joint pivoting movement. The second roll unwinding device 330 embodied as second reel changer 330 preferably enables a flying reel change, i.e. the joining of a new web of laminating material 331 to a web of laminating material 331 that has already been largely unwound, without stopping the webs. Preferably, however, processing machine 01 is stopped in order to change the infeed of laminating material 331 to a new roll. Nevertheless, this is carried out very quickly due to the embodiment as a second reel changer 330.

The at least one second lamination source 330 preferably has at least one second web edge aligner 337, which serves, in particular, for aligning laminating material 331 in axial direction A. The at least one second web edge aligner 337 is preferably a second web edge aligner 337 exclusively for aligning laminating material 331. The at least one second web edge aligner 337 has, for example, at least two alignment rollers, preferably arranged inside a movable frame, and these rollers can be used to adjust the axial position of the second laminating material 331, in particular, by adjusting their position in space. Preferably, the at least one second web edge aligner 337 can be used to change the alignment with respect to axial direction A of laminating material 331 downstream of the at least one second web edge aligner 337 as viewed in the transport direction, in particular without changing the position of the associated roll of laminating material 331 with respect to axial direction A. Alternatively, the position, in particular, of the second laminating material 331 with respect to axial direction A is adjusted, in particular controlled or regulated, by displacing the associated roll of laminating material 331 with respect to axial direction A. The at least one second lamination source 330 preferably has at least one second web tension controller 334, which has, for example, at least one second dancer roller 336 and/or at least one second dancer lever 338. At least one second roll supplying unit is provided, for example, by means of which rolls of laminating material 331 can be supplied to the second roll unwinding device 330. The at least one second roll supplying unit is embodied, for example, as at least one crane and/or at least one lifting device and/or as at least one transporting cart and/or as at least one-track system.

The at least one second roll unwinding device 330 has two support arms per roll holding station 332, for example, each of which more preferably has a clamping shaft bearing, preferably embodied as a bearing cap. In terms of clamping shafts and/or clamping shaft bearings, the at least one second roll unwinding device 330 is preferably embodied similarly to the at least one first roll unwinding device 320.

Laminating material 321 is preferably fed from the at least one first roll unwinding device 320 to a first laminating roller 311 of a laminating unit 310. Laminating material 331 is preferably fed from the at least one second roll unwinding device 330 to a second laminating roller 312 of laminating unit 310. The first laminating roller 311, preferably together with the second laminating roller 312, forms a first lamination zone 313 in their common pressing zone. In the first lamination zone 313, the lamination of the sheets 03 arriving in an overlapping arrangement is preferably carried out. This preferably results in material web 02. The at least one first laminating roller 311 is preferably a first laminating roller 311 that can preferably be heated internally, for example by induction, in particular to at least 100° C. An inner stator with an induction coil and a rotor embodied substantially as a hollow cylinder with an induction coil are provided, for example. The at least one first laminating roller 311 preferably has a lateral surface made of a wear-resistant material, for example steel and/or chromium and/or ceramic and/or a wear-resistant hard metal alloy such as WC/Co, Cr3C2NiCr, NiCrBSi, WC/Ni, TiC/Ni, molybdenum or the like, more preferably applied in a thermal spraying process.

The at least one second laminating roller 312 is preferably a second laminating roller 312 that can be heated in particular internally, for example by induction, preferably to at least 100° C. An inner stator with an induction coil and a rotor embodied substantially as a hollow cylinder with an induction coil are provided, for example. The at least one second laminating roller 312 preferably has a lateral surface made of a relatively soft material, for example rubber. The laminating unit preferably includes at least one heating roller 316 that can be heated, in particular internally, for example by induction, preferably to at least 100° C., disposed upstream of the second laminating roller 312 along the transport path of laminating material 331. An inner stator with an induction coil and a rotor embodied substantially as a hollow cylinder with an induction coil are provided, for example. The at least one heating roller 316 preferably serves to heat laminating material 331. In contrast, the at least one second laminating roller 312 preferably serves to maintain this temperature of laminating material 331 and to press laminating material 331 against the sheets 03. The at least one first laminating roller 311 preferably serves both to heat laminating material 321 and to press laminating material 321 against the sheets 03.

Heating the laminating material 321; 331 preferably converts the material into a state in which a particularly effective joining to sheets 03 can be achieved. For example, an adhesive is thereby activated and/or the laminating material 321; 331 is made self-adhesive by an at least partial phase transition. The pressing in the first lamination zone 313 results in a particularly effective bond between laminating material 321; 331 and sheet 03. An additional pressing roller 317 is preferably provided which, in particular together with the first laminating roller 311, forms a second lamination zone 314 in their common pressing zone. There, the bond between laminating material 321; 331 and sheet 03 introduced in the first lamination zone 313 is further intensified. Pressing roller 317 is arranged, in particular, pressed against the first laminating roller 311. Pressing roller 317 is preferably embodied as heatable internally, in particular to at least 100° C. The at least one pressing roller 317 preferably has a lateral surface made of a relatively soft material, for example rubber.

The second laminating roller 312 is preferably displaceable orthogonally to axial direction A, in particular to disrupt its contact with the first laminating roller 311 and/or with heating roller 316 or to alter its pressing force. Preferably, pressing roller 317 is displaceable orthogonally to axial direction A, in particular to disrupt its contact with the first laminating roller 311 or to alter its pressing force. Laminating device 300 preferably comprises at least two independently operable drives, one of which is associated with at least the first laminating roller 311 and another of which is associated with at least the heating roller 316. For example, the second laminating roller 312 and/or pressing roller 317 can be driven, via a gear mechanism, by means of the same drive as the first laminating roller 311.

Processing machine 01 comprises at least one preheating device 209, for example, which acts or is capable of acting on material 02, in particular on sheets 03, upstream of the first lamination zone 313 along the transport path of material 02. In this way, the process of bonding between material 02 and laminating material 321; 331 can preferably be improved. Along the transport path of material web 02, downstream of laminating unit 310, at least one cooling unit 340 is preferably arranged. The at least one cooling unit 340 preferably has at least one cooling roller 341, more preferably at least one cooling roller 341 on each side of the material web 02, and even more preferably at least three cooling rollers 341. Cooling unit 340 preferably serves to cool the material web 02 that is produced and/or laminated in laminating unit 310.

Laminating machine 01 preferably enables a process for laminating a material 02 and in particular for changing at least one roll of laminating material 321; 331, wherein the material 02 is preferably fed to a laminating unit 310 of laminating machine 01, where it is preferably laminated by bonding to at least one laminating material 321; 331, and wherein the at least one laminating material 321; 331 used for this purpose is preferably unwound from at least one roll in a lamination source 320; 330 embodied as reel changer 320; 330, and wherein two rolls of the at least one laminating material 321; 331 are preferably pivoted together about a common pivot axis 323; 333 of the at least one reel changer 320; 330, and at least one web of the at least one laminating material 321; 331, coming from one of the at least two rolls that has been unwound up to that point, is joined to a web of the at least one laminating material 321; 331, coming from a different one of the at least two rolls, which will be unwound from that point on.

Alternatively or additionally, at least one process for laminating a material 02 is used, wherein the at least one laminating material 321; 331 is preferably unwound from at least one roll in a lamination source 320; 330 embodied at least as roll unwinding device 320; 330, and wherein the laminating material 321; 331 that has been unwound from the at least one roll is aligned, at least with respect to axial direction A, preferably by means of at least one web edge aligner 327 of the at least one roll unwinding device 320;

330, and wherein the web tension of the laminating material 321; 331 that has been unwound from the at least one roll and guided around at least one dancer roller 326; 336 of a web tension controller 324; 334 of the at least one roll unwinding device 320; 330 is preferably controlled and/or regulated by means of said at least one dancer roller 326; 336. Alternatively, or in addition to the alignment with respect to axial direction A of the laminating material 321; 331 that has been unwound from the at least one roll, this roll from which laminating material 321; 331 is unwound is preferably moved with respect to axial direction A.

Sheets 03 are preferably laminated on both sides. If lamination were to fail. This would be evident from the fact that sheets 03 would not be further transported, or would be transported only improperly, downstream of laminating unit 310. However, if sheets 03 were unintentionally to be laminated on only one side, a material web 02 would nevertheless be formed that would consist of a web-type laminating material 321; 331 with sheets 03 bonded thereto. It is important for such a malfunction to be detected. Laminating machine 01 therefore preferably includes at least one lamination monitoring device 348; 349. The at least one lamination monitoring device 348; 349 is capable of detecting a lamination of only one side of a material web 02.

Preferably, the at least one lamination monitoring device 348; 349 is used to advantage in that the sheets 03 are joined in a shingled fashion to form a material web 02. This results in an overlap area for every two sheets 03. In this overlap area, each sheet 03 is bonded to only a maximum of one laminating material 321; 331. If one of the two layers of laminating material 321; 331 is missing, one sheet 03 will not be bonded to any laminating material 321; 331 in the overlap area and can be lifted off of the adjacent sheet 03 in this overlap area. When the material web 02 that is laminated on only one side is deflected with its laminated side around a web deflecting roller 353, this area of sheet 03 that is not bonded to laminating material 321; 331 will protrude away from the adjacent sheet 03 as the overlap area is guided around the curve of web deflecting roller 353. This protrusion occurs merely because sheet 03 is not being pulled by laminating material 321; 331 against the sheet 03 that overlaps with it. The protrusion is therefore a clear indication of the absence of laminating material 321; 331. The protruding region passes through a spatial area that no part of an error-free material web 02 would pass through. Thus, by monitoring this spatial area, an absence of laminating material 321; 331 can be detected based on the presence of a portion of a sheet 03.

Laminating machine 01 preferably comprises at least one material source 100, embodied as sheet feeder 100, for sheets 03 of a material 02 to be laminated, and at least one laminating unit 310 and at least two lamination sources 320; 330, each for at least one web-type laminating material 321; 331, and at least one laminating unit 310 for producing a material web 02 that is laminated on both sides from sheets 03 and the respective at least one laminating material 321; 331. Laminating machine 01 is preferably characterized in that downstream of a lamination zone 313; 314 of laminating unit 310 along a transport path provided for transporting the laminated material web 02, at least one lamination monitoring device 348; 349 is disposed, which monitors a monitoring zone that lies beyond a transport zone which is occupied by the transport path designated for the laminated material web 02.

Alternatively or additionally, laminating machine 01 is preferably characterized in that the at least one lamination monitoring device 348; 349 is situated for monitoring a monitoring zone, at least part of which has a minimum monitoring distance from a web deflecting roller 353. The minimum monitoring distance is preferably less than 20 mm, more preferably less than 10 mm, even more preferably less than 5 mm and more preferably still less than 2 mm. The minimum monitoring distance is preferably smaller than the overlap length of adjacent sheets 03 within the laminated material web 02. This ensures that the protruding area can be detected. The minimum monitoring distance can be adjusted based upon the thickness of sheets 03 and/or of laminating material 321; 331. The overlap length of adjacent sheets 03 is, in particular, the length, measured along the designated transport path of material web 02, over which adjacent sheets 03 are in mutual contact within the laminated material web 02, at least as long as no portion thereof protrudes. The overlap length is preferably at least 2 mm, more preferably at least 3 mm, and even more preferably at least 4 mm, and independently thereof is preferably at most 20 mm, more preferably at most 10 mm, and even more preferably at most 6 mm.

Alternatively or additionally, laminating machine 01 is preferably characterized in that the at least one lamination monitoring device 348; 349 has at least one monitoring element 351, embodied as detector 351. Alternatively or additionally, laminating machine 01 is more preferably characterized in that the at least one lamination monitoring device 348; 349 has at least one monitoring element 352, embodied as transmitting device 352. This enables a signal to be transmitted and received in a targeted manner. For this purpose, the signal must preferably traverse the monitoring zone. If an obstacle is present in the monitoring zone, the signal will not be received. Essentially, the only possible obstacle would be the protruding part of a sheet 03. The absence of the signal is then an indication of the absence of laminating material 321; 331. The signal is preferably an electromagnetic signal, in particular an optical signal, for example a laser beam. Alternatively or additionally, laminating machine 01 is preferably characterized in that the at least one lamination monitoring device 348; 349 has at least one monitoring element 351, embodied as a detector 351 for electromagnetic radiation, and in that the at least one lamination monitoring device 348; 349 has at least one monitoring element 352, embodied as a transmitting device 352 for electromagnetic radiation.

Alternatively or additionally, laminating machine 01 is preferably characterized in that a rectilinear subsection of a beam path between the monitoring element 352 embodied as transmitting device 352 and the monitoring element 351 embodied as detector 351 passes the lateral surface of web deflecting roller 353 at the minimum monitoring distance. The beam path can travel directly from the monitoring element 352 embodied as transmitting device 352 to the monitoring element 351 embodied as detector 351, or can be deflected via at least one reflector.

To be able to detect, in particular, both an absence of the first laminating material 321 and alternatively an absence of the second laminating material 331, laminating machine 01 is preferably alternatively or additionally characterized in that laminating machine 01 has at least two lamination monitoring devices 348; 349, of which a first lamination monitoring device 348 is arranged on a first side of the transport path provided for the laminated material web 02 and of which a second lamination monitoring device 349 is arranged on a second side of the transport path provided for the laminated material web 02, opposite the first side. Alternatively or additionally, laminating machine 01 is more preferably characterized in that the first lamination monitoring device 348 is arranged to monitor a first monitoring zone, at least part of which is at a minimum monitoring distance from a first web deflecting roller 353, and in that the second lamination monitoring device 349 is arranged to monitor a second monitoring zone, at least part of which is at a minimum monitoring distance from a second web deflecting roller 353, and in that, as described above, the minimum monitoring distance is less than 20 mm, more preferably less than 10 mm, even more preferably less than 5 mm and more preferably still less than 2 mm, and/or is smaller than the overlap length of adjacent sheets 03 within the laminated material web 02. Material web 02 preferably touches the two web deflecting rollers 353 with different sides, so that the two lamination monitoring devices 348; 349 can each detect the absence of a different layer of laminating material 321; 331.

As described above, laminating machine 01 preferably comprises the at least one separating device 400 for separating sections 04 from the laminated material web 02. The at least one lamination monitoring device 348; 349 is preferably located downstream of the lamination zone 313; 314 of laminating unit 310 and upstream of separating device 400 along the transport path designated for the transport of laminated material web 02. This is the area in which laminated material web 02 is present. Laminating materials 321; 331 are therefore preferably present in the area in which material web 02 is present and not in the area in which individual sections 04 are present again. This separating device 400 preferably comprises at least one first stretching element 403, wherein the separating device 400 can be switched between at least one first traversing mode and at least one first separation mode by moving at least the at least one first stretching element 403 between at least one first traversing position and at least one first separation position, and wherein at least one separation sensor device 463 is provided for detecting a gap between material web 02 and the section 04 most recently separated. Thus, both the lamination of sheets 03 and the separation of sections 04 from material web 02 can be monitored.

The at least one monitoring element 351 embodied as detector 351 is alternatively or additionally embodied, for example, as a light reflection sensor 351. This enables the monitoring zone to likewise be monitored. Elements of a sheet 03 that penetrate this light reflection sensor 351 directly or diffusely reflect portions of electromagnetic radiation, in particular light. These reflected portions can be detected by detector 351. As the source of electromagnetic radiation, a further monitoring element 352 is provided, for example, embodied as transmitting device 352. This transmitting device 352 forms a single structural unit with detector 351, for example, which can then be mounted in a particularly space-saving manner.

As an alternative to optical sensors, at least one ultrasonic sensor and/or at least one capacitive sensor is provided for monitoring the respective monitoring zone.

The processing machine preferably comprises the at least one separating device 400. As described above, the at least one separating device 400 is preferably embodied for separating the laminated material web 02, in particular, into individual sections 04 and/or for separating sections 04 from the laminated material web 02, in particular. The at least one separating device 400 preferably has at least one forward clamping device 406 having at least one forward clamping point 401 and at least one rear clamping device 404 having at least one rear clamping point 402, and at least one first stretching element 403. More particularly, the at least one forward clamping point 401 is located upstream of the at least one rear clamping point 402 along the designated transport path. By clamping the material web 02 in the forward clamping device 406 and in the rear clamping device 404 and then stretching it, in particular overstretching it, a targeted tearing of material web 02 and thus a separation of individual sections 04 can be achieved. By moving at least the at least one first stretching element 403 between at least one first traversing position and at least one first separation position, separating device 400 can preferably be switched between at least one traversing mode and at least one separating mode. The traversing mode is preferably a mode in which the stretching elements 403; 412; 413 allow material web 02 to traverse separating device 400 unhindered, for example in a straight line between forward clamping point 401 and rear clamping point 402 or along a circular arc between forward clamping point 401 and rear clamping point 402, depending upon the embodiment. This preferably occurs only intermittently, in particular to advance the next designated predetermined separation point to a corresponding position.

A vertical reference plane preferably has a horizontal normal vector. A normal vector is in particular a vector that is oriented orthogonally to every line that is fully contained within the corresponding plane. More preferably, the normal vector points in a direction that runs in or opposite the axial direction A. A respective transport line, in particular, is preferably the shortest connection between the at least one forward clamping point 401 and the at least one rear clamping point 402, said connection lying entirely within especially a respective vertical reference plane, that passes or is tangent to any component of separating device 400 on the same side as a transport path provided for the material web 02 and/or the sections 04. In this context, the same side is understood in particular to mean that, as viewed from the corresponding component, the transport path is closest to this component in substantially the same direction in which the transport line is also closest to this component. The transport line is preferably longer in the at least one separation mode than in the at least one traversing mode, in particular by at least 2 mm, more preferably by at least 4 mm and even more preferably by at least 6 mm. This extension of the transport line, in particular when combined with a clamping of the material web in the forward clamping device 406 and the rear clamping device 404, causes a corresponding region of material web 02 to stretch, and as a result, a corresponding section 04 of material web 02 is separated, preferably at a designated predetermined separation point of material web 02. The area of action of the at least one first stretching element 403 is preferably located between the at least one forward clamping device 406 and the at least one rear clamping device 404 along the transport line.

Separation is preferably achieved by stretching and in particular overstretching the material web 02, and more preferably not by cutting the material web 02. Preferably, every contact line, lying in the reference plane and intended for contact with material web 02, of the at least one first stretching element 403 in the area of the convex curvatures that may be present has a minimum radius in the reference plane, in particular, of at least 0.05 mm, preferably at least 0.1 mm, more preferably at least 0.5 mm and even more preferably at least 2 mm, and more preferably still at least 10 mm. The at least one first stretching element 403 preferably has a contact surface 462, which is intended for contact with the material web 02 and/or the sections 04. The contact region in which such contact between material web 02 and the first stretching element 403 actually exists varies cyclically. The contact line is the intersection between this contact region and the reference plane. In a preferred embodiment, the at least one first stretching element 403, and in particular the contact line thereof, has exclusively a convex curvature, at least in the contact region, wherein the radius of curvature is not necessarily equal everywhere, and instead preferably varies in the circumferential direction. This radius of curvature is always at least 0.05 mm, for example, preferably at least 0.1 mm, more preferably at least 0.5 mm and even more preferably at least 2 mm, and more preferably still at least 10 mm. This preferably ensures that the material web 02 will be stretched, in particular overstretched, by the at least one first stretching element 403, and more preferably not cut. In particular, the at least one first stretching element 403, and more preferably each stretching element 403; 412; 413, is preferably not designed as a blade. Any concave curvatures that may be present typically do not contribute to the contact surface and/or to the contact line.

In the at least one separation mode, for example, the transport line has a minimum radius of curvature of at least 0.05 mm, preferably at least 0.1 mm, more preferably at least 0.5 mm and even more preferably at least 2 mm, and more preferably still at least 10 mm. This will ensure that the material web 02 also will not be cut at any other point along the transport line. To ensure, in particular, a controlled tearing of material web 02 at a desired location, for example at the designated predetermined separation point, the at least one first stretching element 403 is preferably embodied such that the maximum radius of the at least one first stretching element 403 as viewed along the axial direction A increases and/or varies. This results in at least one point at which the material web is first stretched particularly intensely, and thus first tears. The resulting break then preferably spreads along the at least one first stretching element 403 and/or along a designated separation line and/or in axial direction A. Separating device 400 is therefore preferably characterized in that a first reference plane and a second reference plane are arranged spaced apart from one another in the axial direction A, and in that, when the first stretching element 403 is arranged in the at least one first separation position, a first transport line lying entirely within the first reference plane, in particular, and a second transport line lying entirely within the second reference plane, in particular, have different lengths, and/or in that the maximum radius of movement of the at least one first stretching element 403 is greater in the first reference plane than in the second reference plane.

Preferably, the at least one first stretching element 403 is arranged to pivot and/or rotate eccentrically about a first stretching axis 414. In this way, a periodically recurring enlargement and reduction of the transport line can be achieved in a simple manner by means of a rotational movement. Preferably, neither the first clamping device 406 nor the second clamping device 404 has one or more grippers. Downstream of the at least one second stretching device 412 and/or downstream of the at least one first stretching device 403 and/or downstream of the at least one third stretching device 413 in the transport direction of material web 02, at least one feed device 461 is provided, for example, in particular for guiding the leading end of the material web 02 that is created as a result of the separation into the rear clamping point 402. The at least one feed device 461 has at least one blower air nozzle, for example, in particular also pointing downward. The at least one feed device 461 is embodied, for example, as at least one guide plate permeated by a plurality of gas nozzles, these gas nozzles preferably being connected via a common chamber and/or further being connected to a compressed air source.

In a first embodiment of the at least one separating device 400, in addition to at least one first movable stretching element 403 the at least one separating device 400 preferably comprises at least one second stretching element 412 and more preferably at least one third stretching element 413. As a result, intense stretching of the material web 02 can be achieved overall, even with a small movement of the individual stretching elements 403; 412; 413. The at least one separating device 400 is preferably characterized in that the at least one separating device 400 has at least one second stretching element 412, which is movable between a second traversing position and a second separation position, and in that the at least one separating device 400 has at least one third stretching element 413, which is movable between a third traversing position and a third separation position. The at least one second stretching element 412 is preferably located upstream of the at least one first stretching element 403 and upstream of the at least one third stretching element 413 along the transport path designated for material web 02. The at least one first stretching element 403 is preferably located downstream of the at least one second stretching element 412 and upstream of the at least one third stretching element 413 along the transport path designated for material web 02. The at least third stretching element 413 is preferably located downstream of the at least one second stretching element 412 and downstream of the at least one first stretching element 403 along the transport path designated for material web 02.

The at least one first stretching element 403 preferably maintains at all times a distance that is not equal to zero from the at least one second stretching element 412, in particular with respect to a direction orthogonal to the axial direction A. The at least one first stretching element 403 preferably maintains at all times a distance that is not equal to zero from the at least one third stretching element 413, in particular with respect to a direction orthogonal to the axial direction A. The at least one second stretching element 412 preferably maintains at all times a distance that is not equal to zero from the at least one third stretching element 413, in particular with respect to a direction orthogonal to the axial direction A.

This makes it possible for the different stretching elements 403; 412; 413 to act alternately on a first side or a second side of material web 02. A wave-shaped profile of the transport line is thereby produced when the at least one separating device 400 is in the separation mode, which results in a relatively intense overall stretching of material web 02 in the area of the transport line, even with small individual deflections of the individual stretching elements 403; 412; 413. The at least one separating device 400 is more preferably characterized in that when the first stretching element 403 is situated in the first separation position and the second stretching element 412 is situated in the second separation position and the third stretching element 413 is situated in the third separation position, at least one rectilinear connection between the at least one second stretching element 412 and the at least one third stretching element 413 intersects the at least one first stretching element 403, in particular in the geometric sense.

The at least one separating device 400 is preferably characterized in that the at least one first stretching element 403 is arranged to pivot and/or rotate eccentrically about a first stretching axis 414, and/or in that the at least one second stretching element 412 is arranged to pivot and/or rotate eccentrically about a second stretching axis 416, and/or in that the at least one third stretching element 413 is arranged to pivot and/or rotate eccentrically about a third stretching axis 417. In this way, a periodically recurring enlargement and reduction of the transport line can be achieved in a simple manner by means of a plurality of rotational movements. The at least one first stretching element 403 and the at least one second stretching element 412 and the at least one third stretching element 413 are preferably drivable by means of at least one common drive, and/or are preferably coupled to one another via at least one gear mechanism. The first stretching axis 414 is preferably arranged spaced from the second stretching axis 416 and/or from the third stretching axis 417. The second stretching axis 416 is preferably arranged spaced from the third stretching axis 417. The first stretching axis 414 is preferably arranged parallel to the second stretching axis 416 and/or parallel to the third stretching axis 417. The second stretching axis 416 is preferably arranged parallel to the third stretching axis 417. The first stretching axis 414 and/or the second stretching axis 416 and/or the third stretching axis 417 are preferably oriented parallel to axial direction A.

The at least one second stretching element 412 preferably has exclusively one or more convex curves, at least in its contact region and in particular the contact line thereof, wherein the radius of curvature is not necessarily equal everywhere, and instead preferably varies in the circumferential direction. This radius of curvature is always at least 0.05 mm, for example, preferably at least 0.1 mm, more preferably at least 0.5 mm and even more preferably at least 2 mm, and more preferably still at least 10 mm. In a preferred embodiment, the at least one third stretching element 413 has exclusively one or more convex curves, at least in its contact region and in particular the contact line thereof, wherein the radius of curvature is not necessarily equal everywhere, and instead preferably varies in the circumferential direction. This radius of curvature is always at least 0.05 mm, for example, preferably at least 0.1 mm, more preferably at least 0.5 mm and even more preferably at least 2 mm, and more preferably still at least 10 mm. This ensures that the material web 02 will be stretched and not cut by the at least one second stretching element 412 and by the at least one third stretching element 413. In particular, the at least one second stretching element 412 and the at least one third stretching element 413 are preferably not embodied as blades. Any concave curves that may be present typically do not contribute to the contact surface.

For the safe transport of material web 02 and/or the separated sections 04, for example, at least one guide device 418; 419 is provided, at least in the region of the at least one separating device 400. The at least one guide device 418; 419 is embodied as at least one planar guide device 419, for example, in particular rigidly mounted, in particular as at least one guide plate 419, and/or is embodied, for example, as at least one belt guidance system 418. Preferably, both at least one belt guidance system 418 and at least one planar, in particular rigidly mounted guide device 419 are provided. Alternatively or additionally, the at least one separating device 400 is preferably characterized in that the at least one separating device 400 comprises at least one belt guidance system 418, which includes a plurality of conveyor belts 431 that are arranged one after the other in an axial direction A and that are arranged with intermediate spaces located therebetween in this axial direction A. The at least one second stretching element 412 in its second separation position and/or the at least one third stretching element 413 in its third separation position are each preferably arranged protruding at least partially through the intermediate spaces. In this way, the transport line is raised further above the conveyor belts 431 and is thereby lengthened. Then when the at least one first stretching element 403 dips down between the at least one second stretching element 412 and the at least one third stretching element 413, the transport line is further lengthened, without the at least one first stretching element 403 having to reach below the conveyor belts 431.

Alternatively or additionally, the at least one separating device 400 is preferably characterized in that the at least one second stretching element 412 in its second traversing position and/or the at least one third stretching element 413 in its third traversing position is situated completely outside of a half space which is bounded by a transport plane defined by the conveyor belts 431 and in which the at least one first stretching element 403 is situated in its first separation position and/or in its first traversing position. This half space is preferably located above the conveyor belts 431. A half space is understood to refer, in particular, to the spatial area that is bounded solely by one plane. Thus, each plane divides the entire space into two half spaces.

For example, at least one guide plate 419 is provided, which supports the material web 02 and/or the sections 04, at least from below, at least where the intermediate spaces between the conveyor belts 431 are located and at the same time, where no space is required for movements of any of the stretching elements 403; 412; 413.

Preferably, the at least one separating device 400 is characterized in that the at least one forward clamping device 406 has at least one forward draw roller 408 or intake draw roller 408 and at least one forward pressing roller 407 or intake pressing roller 407 that is and/or can be thrown onto said draw roller, and/or in that the at least one rear clamping device 404 has at least one rear draw roller 411 or outlet draw roller 411 and at least one rear pressing roller 409 or outlet pressing roller 409 that is and/or can be thrown onto said draw roller.

In connection with conveyor belts 431, in particular, a special embodiment of front clamping device 406 and/or of rear clamping device 404 is preferred. This embodiment serves in particular to ensure that even after a section 04 has been separated from material web 02, the resulting leading end of material web 02 will be guided reliably into the rear clamping point 402 and/or along the transport path thereof. Preferably, the at least one separating device 400 is characterized in that the forward draw roller 408 has a first plurality of recesses 432 extending around it in the circumferential direction and/or in that the forward pressing roller 407 has a plurality of circumferential recesses 433, which are identical in particular to the first plurality of recesses. Conveyor belts 431 then preferably run through recesses 432, in particular of forward draw roller 408. The depth of recesses 432 of forward draw roller 408 is greater, for example, than the thickness or the smallest dimension of conveyor belts 431. Conveyor belts 431 can therefore be arranged in recesses 432, without coming into contact with material web 02 or sections 04, or at least with only a weak application of force. This allows a minimal or even a greater difference between the speed at which conveyor belts 431 are moving and the speed at which material web 02 or sections 04 are moving, and that corresponds to the peripheral speed of the forward draw roller 408 and/or the forward pressing roller 407 and/or the rear draw roller 411 and/or the rear pressing roller 409. The recesses 432 running circumferentially around forward draw roller 408 are preferably embodied as narrower in the axial direction A than the recesses 433 running circumferentially around forward pressing roller 407, and/or each of the recesses 432 running circumferentially around forward draw roller 408 is arranged paired with and opposite one of the recesses 433 running circumferentially around forward pressing roller 407.

The at least one forward draw roller 408 preferably has a lateral surface made of a wear-resistant material, for example steel and/or chromium and/or ceramic and/or a wear-resistant hard metal alloy such as, for example, WC/Co, Cr3C2/NiCr, NiCrBSi, WC/Ni, TiC/Ni, molybdenum or the like, more preferably applied in a thermal spraying process. The at least one forward pressing roller 407 preferably has a lateral surface made of a relatively soft material, for example rubber. This ensures the reliable forward transport and/or clamping of material web 02 and/or sections 04, without the edges of recesses 432; 433 leaving an imprint on them.

The at least one separating device 400 is preferably characterized in that the rear draw roller 411 has a plurality of recesses 432 running circumferentially, which are identical, in particular, to the first plurality and which preferably correspond substantially to recesses 432 of forward draw roller 408, and/or in that rear pressing roller 409 has a plurality of recesses 433 running circumferentially, which are identical, in particular, to the first plurality and which preferably correspond substantially to recesses 433 of forward pressing roller 408. The recesses 432 running circumferentially around rear draw roller 411 are preferably embodied as narrower in the axial direction A than the recesses 433 running circumferentially around rear pressing roller 409, and/or each of the recesses 432 running circumferentially around rear draw roller 411 is arranged paired with and opposite one of the recesses 433 running circumferentially around rear pressing roller 409. The at least one rear draw roller 411 preferably has a lateral surface made of a wear-resistant material, for example steel and/or chromium and/or ceramic and/or a wear-resistant hard metal alloy, such as, for example, WC/Co, Cr3C2/NiCr, NiCrBSi, WC/Ni, TiC/Ni, molybdenum or the like, more preferably applied in a thermal spraying process. The at least one rear pressing roller 409 preferably has a lateral surface made of a relatively soft material, for example rubber. The depth of recesses 432 of rear draw roller 408 is greater, for example, than the thickness or the smallest dimension of conveyor belts 431. Alternatively, the depth of recesses 432 of rear draw roller 408 is exactly the same as the thickness or the smallest dimension of conveyor belts 431.

Forward draw roller 408 preferably has its own dedicated drive motor, which serves, in particular, to control the speed at which material web 02 is transported through forward clamping point 401. Forward pressing roller 407 is preferably driven passively via contact with forward draw roller 408. Rear draw roller 411 preferably has its own dedicated drive motor, which serves, in particular, to control the speed at which material web 02 and/or the respective section 04 is transported through rear clamping point 402. Rear pressing roller 409 is preferably driven passively via contact with rear draw roller 411. Additionally or alternatively, the at least one separating device 400 is preferably characterized in that the at least one first stretching element 403 and/or the at least one second stretching element 412 and/or the at least one third stretching element 413 can be driven via a common drive and/or independently of forward clamping device 406 and/or of rear clamping device 404.

For example, at least one separation feed roller 429 is provided, which ensures the proper feed of material web 02 to separating device 400. Preferably, conveyor belts 431 are in contact with rear draw roller 411 at an angle of at least 90° and are driven by said roller. Alternatively, a different roller is responsible for driving conveyor belts 431, for example a roller arranged downstream of rear draw roller 411 along the transport path of sections 04. Preferably, one or more deflecting rollers 426; 427 are provided, which guide conveyor belts 431 around forward draw roller 408. Conveyor belts 431 then have only minimal contact with forward draw roller 408 and can be driven independently thereof. Preferably, at least one tensioning roller 428 is provided, which serves to adjust the tension of conveyor belts 431.

In an alternative second embodiment of separating device 400, separating device 400 has, in particular in place of the second and third stretching elements 412; 413, at least one supporting cylinder 451, which has at least one first cylinder channel 452. This separating device 400 then preferably has at least one stretching cylinder 453, which cooperates with supporting cylinder 451 and which carries the at least one first stretching element 403 and has at least one second cylinder channel 454. The second cylinder channel 454 preferably extends at least 30° and more preferably at least 90°, and at most 270° and more preferably at most 180° in a circumferential direction around the at least one stretching cylinder 453. Separating device 400 then preferably has at least one first clamping cylinder 456, which has at least one first clamping protrusion 457 that, together with supporting cylinder 451, forms forward clamping device 406, preferably in at least one clamping position. The at least one first clamping protrusion 457 preferably extends at least 90° and more preferably at least 180°, and preferably at most 30° and more preferably at most 90° in a circumferential direction around the at least one first clamping cylinder 456. Separating device 400 then preferably has at least one second clamping cylinder 458, which has at least one second clamping protrusion 459 that, together with supporting cylinder 451, forms rear clamping device 404, preferably in at least one clamping position.

The at least one second clamping protrusion 459 preferably extends at least 90° and more preferably at least 180°, and preferably at most 30° and more preferably at most 90° in a circumferential direction around the at least one second clamping cylinder 458. Preferably, at least the at least one supporting cylinder 451 and the at least one stretching cylinder 453 can be driven jointly and/or by means of a common drive, and/or can be driven independently of the at least one first clamping cylinder 456 and/or independently of the at least one second clamping cylinder 458.

The at least one supporting cylinder 451 preferably has a lateral surface made of a wear-resistant material, for example steel and/or chromium and/or ceramic and/or a wear-resistant hard metal alloy, such as, for example, WC/Co, Cr3C2/NiCr, NiCrBSi, WC/Ni, TiC/Ni, molybdenum or the like, more preferably applied in a thermal spraying process. Stretching cylinder 453 and/or the first clamping cylinder 456 and/or the second clamping cylinder 458 preferably each have a lateral surface made of a relatively soft material, for example rubber.

Regardless of whether the at least one separating device 400 is of the first or the second embodiment, it preferably allows a method for separating at least one section 04 from a material web 02. For example, sheets 03 are first removed from a sheet pile 102 and singulated, in particular so that each sheet 03 is spaced by a distance from the sheet 03 immediately adjacent to it. The singulated sheets 03 are then preferably aligned individually. The aligned sheets 03 are then preferably brought into a shingled position relative to one another. More particularly, each sheet 03 is placed partially underneath the sheet 03 that precedes it. This arrangement is referred to as shingling. Sheets 03, which are shingled but are nevertheless still independent relative to one another, are then joined by means of at least one laminating material 321; 331 to form a material web 02. Material web 02, in particular regardless of how it is produced, is preferably firmly clamped in at least one forward clamping point 401 of at least one forward clamping device 406 and is preferably firmly clamped in at least one rear clamping point 402 of at least one rear clamping device 404. A transport line is preferably the shortest connection between the at least one forward clamping point 401 and the at least one rear clamping point 402, said connection lying entirely within a vertical reference plane and passing or forming a tangent to any component of separating device 400 on the same side as material web 02 and/or the at least one section 04. At least one first stretching element 403 is moved from a first traversing position to a first separation position, thereby stretching the transport line far enough to tear the at least one section 04 off of material web 02. In particular, it tears the at least one section 04 off of material web 02 by tearing the at least one laminating material 321; 331.

Material web 02 preferably tears in each case at a designated predetermined separation point. After tearing, the separated section 04 preferably initially remains clamped in the rear clamping point 402 and can thus be further guided and transported by rear clamping device 402. After tearing, material web 02 preferably initially remains clamped in the forward clamping point 401 and can thus be further guided and transported by forward clamping device 401.

More particularly, the at least one first stretching element 403 is moved from the first traversing position to the first separation position while material web 02 and any sections 04 that have already been separated are advanced along the transport path. Thus, it is not necessary to interrupt the transport of material web 02 and of the separated sections 04. This is preferably made possible by the fact that clamping points 401; 402 are formed by rotating components.

In the following, part of a method in which the first embodiment of separating device 400 is used will be described. First, material web 02 is clamped in both the forward clamping point 401 and the rear clamping point 402, but is nevertheless transported through both clamping points 401; 402 due to the rotation of forward draw roller 408 about its rotational axis 422 and of forward pressing roller 407 about its rotational axis 421, and due to the rotation of rear draw roller 411 about its rotational axis 424 and of rear pressing roller 409 about its rotational axis 423. While material web 02 is being transported, the at least one second stretching element 412 is pivoted about its second stretching axis 416 and is thereby brought into a spatial area that was previously occupied by material web 02. The at least one second stretching element 412 is thereby raised, for example, above a plane that is formed by conveyor belts 431. As a result, the transport line is deflected, in particular raised, and is therefore stretched or lengthened. The direction of rotation of the at least one second stretching element 412 is preferably selected such that in the positions, in particular the separation positions, in which it lengthens the transport line, the at least one second stretching element 412 has a movement component that runs parallel to the direction of transport of material web 02. This preferably results in as little relative movement as possible between material web 02 and the at least one second stretching element 412. Undesirable damage to material web 02 is thereby reduced or avoided. The angular range of movement of the at least one second stretching element 412 in which the at least one second stretching element 412 protrudes at least partially above the plane that is formed by conveyor belts 431 is preferably at least 100° and more preferably at least 120°, and is preferably at most 150° and more preferably at most 130°.

Also while material web 02 is being transported, the at least one third stretching element 413 is pivoted about its third stretching axis 417 and is thereby brought into a spatial area that was previously occupied by material web 02. The at least one third stretching element 413 is thereby raised, for example, above the plane that is formed by conveyor belts 431. As a result, the transport line is deflected, in particular raised, and is therefore stretched or lengthened. The direction of rotation of the at least one third stretching element 413 is preferably selected such that in the positions, in particular the separation positions, in which it lengthens the transport line, the at least one third stretching element 413 has a movement component that runs parallel to the direction of transport of material web 02. This preferably results in as little relative movement as possible between material web 02 and the at least one third stretching element 413. Undesirable damage to material web 02 is thereby reduced or avoided. The angular range of movement of the at least one third stretching element 413 in which the at least one third stretching element 413 protrudes at least partially above the plane that is formed by conveyor belts 431 is preferably at least 100° and more preferably at least 120°, and is preferably at most 150° and more preferably at most 130°.

Also while material web 02 is being transported, the at least one first stretching element 403 is pivoted about its first stretching axis 414 and is thereby brought at least partially into a spatial area that at that time is located between portions of the at least one second stretching element 412 and portions of the at least one third stretching element 413. The at least one first stretching element 403 is thereby lowered, for example, between the at least one second stretching element 412 and the at least one third stretching element 413. As a result, the transport line is further lengthened, in particular because in this area it is prevented from being raised and/or is lowered, and is thereby stretched or lengthened. The direction of rotation of the at least one first stretching element 403 is preferably selected such that in the positions, in particular the separation positions, in which it lengthens the transport line, the at least one first stretching element 403 has a movement component that runs parallel to the direction of transport of material web 02. This preferably results in as little relative movement as possible between material web 02 and the at least one first stretching element 403. Undesirable damage to material web 02 is thereby reduced or avoided. In that case, the method is preferably characterized in that, in order to stretch the transport line, at least one second stretching element 412 is moved from a second traversing position to a second separation position, and/or at least one third stretching element 413 is moved from a third traversing position to a third separation position, and the transport line receives at least one additional turning point with respect to its curvature, in particular as a result of said movements. A turning point is, in particular, a point at which a curve changes its direction and/or its sign.

Lengthening the transport line causes section 04 to be separated from material web 02. The predetermined separation point is preferably located in the region of the at least one first stretching element 403 with respect to the transport path of the material web 02. The separated section 04 is further transported by rear clamping device 404. At the latest following a further movement of stretching elements 403; 412; 413, the leading end of material web 02 preferably rests on conveyor belts 431, and is guided by these into rear clamping device 404. The cycle then begins again. When stretching elements 403; 412; 413 are disposed in their respective traversing positions, they are preferably not in contact with material web 02. Particularly because stretching elements 403; 412; 413 are preferably driven independently of the drives of clamping devices 404; 406, the stretching elements can be operated at higher or lower speeds and can then be accelerated again inversely. Separating device 400 can thereby be adapted to different lengths between predetermined separation points, and thus to different lengths of sheets 03 and/or sections 04.

Alternatively or additionally, the method is preferably characterized in that the at least one first stretching element 403 and/or the at least one second stretching element 412 and/or the at least one third stretching element 413 is driven independently of the forward clamping device 406 and/or independently of the rear clamping device 404 and/or at respective angular velocities that fluctuate periodically, in particular. This enables the adjustment to different section lengths, i.e. different desired lengths of sections 03. In addition, it enables the relative speed between material web 02 and the first stretching element 403 and/or the second stretching element 412 and/or the third stretching element 413 to be minimized, in particular despite the fact that the speed of the respective stretching element 403; 412; 413, because of its rotation, is divided the majority of the time between a component parallel to the direction of transport of material web 02 and a component orthogonal thereto.

Alternatively or additionally, the method is preferably characterized in that the angular velocity of the at least one second stretching element 412 while said element is in contact with material web 02 is initially decreased and is then increased again, and/or while said element is spaced a distance from material web 02 it is driven at an angular velocity that varies as a function of the desired section length, and/or in that the angular velocity of the at least one third stretching element 413 while said element is in contact with material web 02 is initially decreased and is then increased again, and/or while said element is spaced a distance from material web 02 it is driven at an angular velocity that varies as a function of the desired section length. Alternatively or additionally, the method is preferably characterized in that the angular velocity of the at least one second stretching element 412 always coincides with the angular velocity of the at least one third stretching element 413.

The separating device 400 for separating sections 04 from a material web 02, which as described above preferably has at least one forward clamping device 406 with at least one forward clamping point 401 and at least one rear clamping device 404 with at least one rear clamping point 402 and which has at least one first stretching element 403, wherein the separating device 400 can be switched between at least one traversing mode and at least one separation mode, preferably by moving at least the at least one first stretching element 403 between at least one first traversing position and at least one first separation position, or the laminating machine 01 that comprises this separating device 400 preferably has at least one separation sensor device 463. This at least one separation sensor device 463 is preferably connected in terms of circuitry to a machine controller for laminating machine 01.

Preferably, at least one separation sensor device 463 for detecting a respective gap between material web 02 and the most recently separated section 04 is provided. This separation sensor device 463 can thus be used to monitor whether a section 04 has been successfully separated from material web 02. For this purpose, separation sensor device 463 preferably measures directly in the area in which separation occurs, i.e. in the region of separating device 400. Separating device 400 is preferably characterized in that the at least one separation sensor device 463 comprises at least two sensor elements 464; 466; 467, and in that at least one rectilinear connection between these at least two sensor elements 464; 466; 467 intersects a designated transport path for material web 02 through separating device 400. It is then possible to target the measurement of a signal that can be determined at the moment of separation. For example, the overstretching and tearing of section 04 off from material web 02 results, at least for a short time, in a narrow gap between material web 02 and the just-separated section 04. A signal, for example, an electromagnetic signal, in particular a light signal, can be transmitted through this gap. If the signal is transmitted, this is confirmation that the gap has existed, at least for a short time, even if a subsequent reduction of the transport line by a movement of stretching elements 403; 412; 413 brings the just-produced trailing end of the just-separated section 04 back into an overlapping position with a just-produced leading end of material web 02, interrupting the signal again. The subsequent overlap does not place the successful separation of section 04 in question.

Separating device 400 is preferably characterized in that the at least one separation sensor device 463 has at least one first sensor element 467, which is located above a designated transport path for material web 02 through separating device 400, and in that the at least one separation sensor device 463 has at least one second sensor element 464; 466, which is located below the transport path of material web 02 through separating device 400.

The at least one separation sensor device 463 preferably has at least one sensor element 464 embodied as a detector 464, which is further preferably embodied as at least one detector 464 for electromagnetic radiation. Preferably, the at least one separation sensor device 463 has at least one sensor element 466 embodied as a transmitting device 466 for electromagnetic radiation. For example, transmitting device 466 is a light source, in particular a light-emitting diode. The at least one detector 466 is embodied, for example, as a light sensor 466 or photocell 466.

Separating device 400 is preferably characterized in that the at least one separation sensor device 463 has at least one sensor element 467 embodied as a reflector 467, more particularly embodied as a reflector 467 for electromagnetic radiation.

Alternatively or additionally, separating device 400 is preferably characterized in that at least one sensor element 464; 466; 467 is arranged as movable together with the at least one first stretching element 403, and/or in that at least one sensor element 464; 466; 467 is stationary relative to the at least one first stretching element 403. In particular, the at least one sensor element 467 embodied as reflector 467 is preferably arranged as movable together with the at least one first stretching element 403 and/or as stationary relative to the at least one first stretching element 403. Alternatively or additionally, at least one sensor element 464; 466; 467 is preferably arranged as stationary relative to a frame of separating device 400, and more preferably, the at least one sensor element 464 embodied as detector 464 is arranged as stationary relative to the frame of separating device 400, and/or the at least one sensor element 466 embodied as transmitting device 466 is arranged as stationary relative to the frame of separating device 400.

In a preferred embodiment, the at least one detector 464 is embodied as sensor element 464, which is arranged below the transport path of material web 02 through separating device 400, and the at least one transmitting device 466 for electromagnetic radiation is embodied as sensor element 466, which is arranged below the transport path of material web 02 through separating device 400, and the at least one reflector 467 is embodied as sensor element 467, which is arranged above the designated transport path of material web 02 through separating device 400. Electromagnetic radiation that is emitted by transmitting device 466 with a corresponding relative alignment can then be reflected by reflector 467 and directed toward detector 464. However, this is possible only as long as the beam path is not disrupted by material web 02 or by sections 04 that have been separated therefrom.

Separating device 400 is preferably characterized in that at least, and more preferably, only when the first stretching element 403 is disposed in its separation position is a beam path of electromagnetic radiation emanating from transmitting device 466 reflected by a reflector 467 of separation sensor device 463 and directed toward detector 464 of separation sensor device 463. Firstly, the beam path is disrupted by material web 02 unless a separation has just taken place and/or is in progress. Secondly, at least with a corresponding positioning of reflector 467 on first stretching element 403, the position of this first stretching element 403 is relevant because reflection is possible only when reflector 467 is aligned accordingly. A situation in which a reflection and thus a registration of a corresponding signal is possible preferably exists only when the first stretching element 403 is disposed in its separation position and the transport line has been enlarged enough that a section 04 of material web 02 has been torn off, and the overlap has been eliminated at that point, creating a gap between material web 02 and section 04. For this overstretching, first stretching element 403 preferably must also be disposed in its separation position.

Alternatively, separating device 400 is characterized in that at least, and more preferably only, when the first stretching element 403 is disposed in its separation position does a transmission direction point directly from the at least one transmitting device 466 toward a detector 464 of separation sensor device 463.

During regular operation, the successful separation of a section 04 from material web 02 should then be confirmed once per movement cycle of at least the first stretching element 403. This is preferably monitored by a machine controller. The absence of the expected signal indicates a fault, such as an incomplete or missing separation. In response, the operation of separating device 400 and/or of laminating machine 01 may be interrupted, for example.

In the following, part of a method in which the second embodiment of separating device 400 is used will be described. In this case, the method is preferably characterized in that the at least one first stretching element 403, in its separation position, occupies a position in which it is intersected by a rectilinear connection between two channel edges that delimit the first cylinder channel 452, and as a result, the curvature of the transport line obtains at least one additional turning point.

First, material web 02 travels between forward clamping point 401 and rear clamping point 402. Forward clamping point 401 is defined by a forward clamping device 406, which in this case is formed by supporting cylinder 451 and by the at least one first clamping cylinder 456, more particularly its first clamping protrusion 457. Rear clamping point 402 is defined by a rear clamping device 404, which in this case is formed by supporting cylinder 451 and by the at least one second clamping cylinder 458, more particularly its second clamping protrusion 458. The rotation of supporting cylinder 451 and first clamping cylinder 456 and second clamping cylinder 458 transports material web 02 forward. When the at least one stretching cylinder 453 is in a corresponding rotational position, the first stretching element 403 attached thereto dips into the first cylinder channel 452 of supporting cylinder 451, which at that point is opposite the at least one stretching cylinder 453. This causes a lengthening or stretching of the transport line, and thus the tearing of material web 02 similarly to the method involving the first embodiment of the at least one separating device 400.

The separated section 04 is conveyed further from rear clamping point 402 and transferred to a device 502; 503 that will ensure its continued safe transport, for example, a further clamping point 503 or a conveyor belt 502 or a suction belt 502. Once this has taken place, a section length adjustment is made, for example, by briefly rotating the at least one supporting cylinder 451 and the at least one stretching cylinder 453 at a different peripheral speed from the first clamping cylinder 456 and the second clamping cylinder 458. To make this possible, the circumference of the first clamping cylinder 456 is preferably divided into the first clamping protrusion 457 and a segment 04 that is lowered in relation to the first, so that the first clamping cylinder 456 is intermittently out of contact with supporting cylinder 451. Furthermore, the circumference of the second clamping cylinder 458 is preferably divided into the second clamping protrusion 459 and a segment 04 that is lowered in relation to the first, so that the second clamping cylinder 458 is intermittently out of contact with supporting cylinder 451, in particular at the same time as the first clamping cylinder 456. The second cylinder channel 454 of the at least one stretching cylinder 453 is preferably likewise selected in terms of its position and its circumferential extension such that the at least one supporting cylinder 451 is also out of contact with the at least one stretching cylinder 453 at the same time. This enables supporting cylinder 451 to be rotated without affecting material web 02. Instead, the material web glides along supporting cylinder 451 during this time. Supporting cylinder 451 preferably has one opening or a plurality of openings for suctioning and/or expelling gas, in particular air, for example for selectively securing and/or releasing the material web 02 disposed thereon and/or the portion of the corresponding section 04 disposed thereon.

The second cylinder channel 454 of the at least one stretching cylinder 453 and the second clamping protrusion 459 of the second clamping cylinder 458 are preferably selected in terms of their respective positions and circumferential extensions such that after a section 04 is separated from material web 02, the leading end of material web 02 is guided safely to rear clamping point 402, and more preferably to the device 502; 503 downstream, before stretching cylinder 453 and the second clamping cylinder 458 move back out of contact with supporting cylinder 451.

Independently of the embodiment of the at least one separating device 400, this is followed by a further transport of the separated sections 04, in particular by means of a corresponding device 502, for example a conveyor belt 502 and/or a suction belt 502. Downstream of separating device 400, sections 04 are preferably brought at least briefly to an increased speed to achieve the singulation of the sections. This facilitates dropping onto at least one delivery pile. Processing machine 01 preferably has at least one sheet delivery unit 500. Sheet delivery unit 500 is embodied, for example, as a multiple sheet delivery unit 500. Sections 04 are preferably dropped onto one or more piles in sheet delivery unit 500. For example, sheet delivery unit 500 has three delivery piles, of which two are preferably provided for the uninterrupted processing of sheets 03 and/or sections 04, and one is embodied as a waste pile. Before being dropped onto one of the piles, sections 04 are preferably decelerated again.

Processing machine 01 has at least one disposal unit 501; 504, for example, in particular for laminating material 321; 331 and more preferably exclusively for laminating material 321; 331. The at least one disposal unit 501; 504 includes, for example, at least one suction device 501 and/or at least one shredding device 501 and/or at least one cutting device 504 for cross-cutting laminating material 321; 331. The at least one cutting device 504 is preferably embodied as a laser cutting device 504 and/or as a thermal cutting device 504 and/or as a cutting device 504 exclusively for laminating material 321; 331. A thermal cutting device 504 is, in particular, a device having a heated and/or heatable element, which uses thermal energy to cut through the laminating material 321; 331 on contact. Distinction should be made in particular between the at least one cutting device 504 and the separating device 400.

Cutting device 504 has at least one drive, for example, in particular at least one electric and/or pneumatic and/or hydraulic and/or magnetic drive. For example, at the start of operation of processing machine 01, first two webs of laminating material 321; 331 are guided into laminating unit 310, where they are joined, and are guided through separating device 400 up to the disposal unit 501; 504. The process of feeding in the material to be laminated 02, in particular the sheets 03, and of producing the actual material web 02 does not begin until later. The part of the webs of laminating material 321; 331 in which no sheets 03 are incorporated is preferably disposed of by the disposal unit 501; 504, for example it is separated from the remaining material web 02 by cutting device 504 and/or suctioned away by suction device 501 and/or shredded by shredding device 501. As soon as the portion of material web 02 that contains the first sheet 03 enters the area of disposal unit 501; 504, the portion consisting only of laminating material 321; 331 is severed from the first portion that also consists of sheet 03. For this purpose, a cut is preferably made in the axial direction A by cutting device 504, in particular laser cutting device 504. Cutting device 504 thereby preferably severs laminating material 321; 331 over its entire extension in the axial direction A. Disposal unit 501; 504 preferably disposes of laminating material 321; 331 over its entire extension in the axial direction A. Thereafter, processing machine 01 is run in continuous operation as described above.

Laminating machine 01, which preferably has at least one material source 100 for material 02 to be laminated, and which preferably has at least one laminating unit 310, and which preferably has at least one lamination source 320; 330 for at least one web-type laminating material 321; 331, is preferably characterized by at least one webbing-up means 342; 343. In particular, at least one webbing-up means 342; 343 that is movable along at least one webbing-up path 344; 346 for feeding in the laminating material 321; 331 preferably is and/or can be arranged at least intermittently, and more preferably permanently, within the laminating unit 310. The webbing-up means 342; 343 is different, in particular, from the laminating material 321; 331 in each case. In particular, laminating machine 01 is preferably characterized in that at least parts of the at least one webbing-up path 344; 346, and more preferably all parts of the at least one webbing-up path 344; 346, and/or the entire webbing-up path 344; 346 is/are spaced by a distance of at least 1 cm, more preferably at least 2 cm, even more preferably at least 4 cm and more preferably still at least 8 cm in axial direction A from every component of a transport path provided for the at least one laminating material 321; 331 within laminating unit 310.

Alternatively or additionally, laminating machine 01 is preferably characterized in that the at least one laminating unit 310 has at least one laminating roller 311; 312 and/or at least one pressing roller 317, which in pairs form at least one lamination zone 313; 314 in their respective common pressing zone, and in that at least one such laminating roller 311; 312 and/or at least one such pressing roller 317 is mounted movably in a direction orthogonal to axial direction A between at least one laminating position and at least one infeed position. This mobility not only enables the adjustment of the pressing force in the lamination zone 313; 314, but also facilitates the infeed of laminating material 321; 331. More particularly, the space that is necessary for feeding through one or more webs of laminating material 321; 331, optionally together with appropriate connecting elements 347, can be created as a result. Thus, when laminating roller 311; 312 and/or pressing roller 317 is/are in their respective infeed positions, in at least one lamination zone 313; 314, a distance is preferably created between the laminating rollers 311; 312 and/or pressing rollers 317 that are arranged forming this lamination zone 313; 314, which allows the infeed of at least one web-type laminating material 321; 331. This distance is preferably at least 0.5 mm, more preferably at least 1 mm, even more preferably at least 2 mm and more preferably still at least 5 mm, and independently thereof, is preferably at most 100 mm, more preferably at most 50 mm, even more preferably at most 20 mm and more preferably still at most 10 mm. Axial direction A is preferably oriented parallel to a rotational axis of a laminating roller 311; 312 and/or parallel to a rotational axis of a pressing roller 317.

Laminating machine 01 is preferably characterized in that at least one web-type laminating material 321; 331 is and/or can be connected via at least one connecting element 347 to the at least one webbing-up means 342; 343. This connecting element 347 is preferably embodied as at least one webbing-up kite 347.

The at least one webbing-up means 342; 343 is embodied, for example, as a finite webbing-up means 342; 343, in particular as a webbing-up chain 342; 343 or as a finite webbing-up belt 342; 343. Preferably, however, the at least one webbing-up means 342; 343 is embodied as at least one continuous webbing-up means 342; 343, in particular as at least one webbing-up belt 342; 343, which more preferably is continuous. The at least one webbing-up means 342; 343 is preferably arranged permanently along its at least one webbing-up path 344; 346 within laminating machine 300.

Each at least one webbing-up means 342; 343 has at least two designated connection points, for example, at which at least one web-type laminating material 321; 331 can be connected directly and/or via at least one connecting element 347 to the at least one webbing-up means 342; 343.

Alternatively or additionally, laminating machine 01 is preferably characterized in that at least two different webbing-up means 342; 343, each of which is movable along at least one respective webbing-up path 344; 346, are and/or can be arranged at least intermittently and more preferably permanently, at least within laminating unit 310, for the separate, in particular, and/or the simultaneous webbing-up of different laminating materials 321; 331. A first webbing-up means 342 can thus web up the first laminating material 321, which will be used for laminating the sheets 03 on a first side, for example, the top. Independently of this, at the same time or with a time delay, a second webbing-up means 343 can web up the second laminating material 331, which will be used for laminating the sheets 03 on an opposite, second side, for example the bottom. In particular, to ensure this independence, laminating machine 01 is preferably alternatively or additionally characterized in that the respective webbing-up paths 344; 346 of the at least two different webbing-up means 342; 343 are spaced from one another in axial direction A, and/or in that at least segments of the transport path provided for the at least one laminating material 321; 331 within laminating unit 310 are located, with respect to the axial direction A, between at least two webbing-up paths 344; 346, each of which is associated with the other of the at least two webbing-up means 342; 343.

The first laminating material 321 preferably comes from the first lamination source 320. The second lamination material 331 preferably comes from the second lamination source 330. Alternatively or additionally, laminating machine 01 is preferably characterized in that a first webbing-up path 344 associated with a first webbing-up means 342 is associated with a first lamination source 320, and a second webbing-up path 346 associated with a second webbing-up means 343 is associated with a second lamination source 330. This association is evident, for example, in that the first webbing-up path 344 extends relatively close to the first lamination source 320. The first laminating material 321 coming from said source can then be connected particularly easily to the first webbing-up means 342, directly or via a connecting element 347, for example manually or automatically. This association is further evident, for example, in that the second webbing-up path 346 extends relatively close to the second lamination source 330. The second laminating material 331 coming from said source can then be connected particularly easily to the second webbing-up means 343, directly or via a connecting element 347, for example manually or automatically.

It is preferably nevertheless ensured that the first webbing-up path 344 and the second webbing-up path 344 are associated with the same laminating unit 310. Laminating materials 321; 331 coming from the two lamination sources 320; 330 can thus be fed to the same laminating unit 310, where they are used to laminate the material 02 on both sides. More preferably, laminating machine 01 is alternatively or additionally characterized in that the first webbing-up path 344 and the second webbing-up path 346 are associated with the same separating device 400 of laminating machine 01. The two laminating materials 321; 331 can then be guided individually or together up to and through the separating device 400. Even more preferably, laminating machine 01 is alternatively or additionally characterized in that the first webbing-up path 344 and the second webbing-up path 346 are associated with the same disposal unit 501; 504 and/or cutting unit 504 of laminating machine 01. The two laminating materials 321; 331 can then be guided individually or together up to this disposal unit 501; 504 and/or cutting unit 504.

Preferably, at least one webbing-up guiding element is provided, by means of which the at least one webbing-up path 344; 346 of the at least one webbing-up means 342; 343 can be and/or is defined. The at least one webbing-up guiding element is preferably embodied as a chain track or deflecting roller.

A process for laminating a material 02, in particular sheets 03, is preferred. In this process, at least one laminating material 321; 331 is preferably guided from a lamination source 320; 330 through the at least one laminating unit 310 and more preferably through the at least one cooling unit 340 and/or the at least one separating device 400, wherein the at least one laminating material 321; 331 is guided at least partially along a transport path that is provided at least for the laminated material 02.

During a method for laminating a preferably sheet-type material 02 or sheets 03 of a material 02, at least one webbing-up process for webbing up at least one web-type laminating material 321; 331 is preferably carried out in at least one laminating unit 400 of a laminating machine 01. The webbing-up process is preferably characterized in that in the webbing-up process, at least one webbing-up means 342; 343 is moved along a webbing-up path 344; 346 through the at least one laminating unit 310, pulling the at least one web-type laminating material 321; 331 along a transport path designated for this at least one laminating material 321; 331, and in that the webbing-up path and the designated transport path are spaced apart from one another as viewed in the axial direction A.

As described above, the at least one laminating unit 310 preferably comprises at least one laminating roller 311; 312 and/or at least one pressing roller 317, which in pairs form at least one lamination zone 313; 314 in their respective common pressing zone. Alternatively or additionally, the method is preferably characterized in that first, in an opening process, at least one such laminating roller 311; 312 and/or at least one such pressing roller 317 is moved orthogonally to the axial direction A from a laminating position to a webbing-up position. This is followed, in particular, by a traversing process, in which a leading end of the web-type laminating material 321; 331 preferably traverses the at least one lamination zone 313; 314, and more preferably both lamination zones 313; 314, in particular pulled by the respective webbing-up means 342; 343. Alternatively or additionally, the method is preferably characterized in that subsequently, in a throw-on process, the at least one such laminating roller 311; 312 and/or the at least one such pressing roller 317 is moved orthogonally to axial direction A from the webbing-up position to the laminating position. More preferably, the lamination process is then started.

Alternatively or additionally, the method is preferably characterized in that the at least one connecting element 347 traverses at least one lamination zone 313; 314 of the at least one laminating unit 310 while at least one laminating roller 311; 312 and/or pressing roller 317 that contributes to defining this at least one lamination zone 313; 314 is disposed in its webbing-up position, which is different from a lamination position assigned to this laminating roller 311; 312 and/or pressing roller 317.

Alternatively or additionally, the method is preferably characterized in that in a connecting process, the at least one webbing-up means is connected to the at least one web-type laminating material 321; 331, directly or more preferably by means of at least one connecting element 347. This preferably occurs prior to the traversing process. Connection is achieved, for example, by hooking and/or magnetically and/or by a screw connection and/or by closing a hook and loop fastener.

Alternatively or additionally, the method is preferably characterized in that after the webbing-up process, the material 02 to be laminated is fed to the at least one laminating unit 310, where it is laminated by bonding to the at least one web-type laminating material 321; 331. More preferably, the unwinding and joint pivoting and joining of the webs of laminating materials 321; 331 as described above takes place at that time.

Once the laminating material 321; 331 has been webbed up, the material 02 to be laminated is preferably transported into laminating unit 310, where a laminated material web 02 is produced. It is also possible for the material 02 to have already been moved into another region of processing machine 01 and for lamination to begin, but it preferably does not begin until then. A leading portion of the at least one laminating material 321; 331 is preferably fed to disposal unit 501; 504, for example manually and/or by suctioning the leading end of laminating material 321; 331. Said portion preferably includes two layers of laminating material 321; 331, in particular one layer from the upper lamination source 320 and one from the lower lamination source 330. The leading portion of the at least one laminating material 321; 331 is preferably separated from the remaining laminating material 321; 331 and/or from the laminated material web 02, more particularly being cut off, for example by means of the cutting device 504, which is preferably embodied as a laser cutting device 504. The laminated material web 02 is preferably transported along a different transport path from the leading portion of the at least one laminating material 321; 331. For example, the leading portion of the at least one laminating material 321; 331 is suctioned upward, while the laminated material web 02 is further transported substantially horizontally. This enables a particularly simple start of operation of laminating machine 01, because in regions downstream, for example in sheet delivery unit 500 or in multiple sheet delivery unit 500, the handling of plain laminating material 321; 331 is not necessary; instead, it is necessary only to handle properly or poorly laminated sections 04, which in particular have different material properties from plain laminating material 321; 331, for example greater stability.

Processing machine 01 preferably has at least one, in particular higher-level machine controller. This machine controller preferably monitors, in particular, whether the overlap of sheets 03 is correct and/or whether lamination is proceeding as intended and/or whether the separation of sections 04 from material web 02 is successful.

Laminating machine 01 which, as described above, preferably has at least one material source 100, embodied as a sheet feeder 100, for sheets 03 of a material 02 to be laminated, and preferably has at least one shingling unit 200; 206; 207; 208 for placing non-laminated sheets 03 in a shingled arrangement relative to one another, and preferably has at least one laminating unit 310 for producing a laminated material web 02 from sheets 03, is preferably alternatively or additionally characterized in that downstream of the at least one laminating unit 310 along a transport path provided for the laminated material web 02, at least one thickness monitoring device 354 is disposed, the monitoring zone of which overlaps at least partially with the transport path designated for the laminated material web 02. The at least one thickness monitoring device 354 preferably has at least one overlap sensor 354. Alternatively or additionally, laminating machine 01 is preferably characterized in that the at least one thickness monitoring device 354 has at least one ultrasonic sensor and/or at least one optical sensor.

Thickness monitoring device 354 can preferably be used to check the thickness of a material currently located in its monitoring zone. The transport path of material web 02 and thus also of material web 02 itself preferably runs through this monitoring zone. Different layerings of materials pass through the monitoring zone. Possible layerings include a layer of sheets 03 that is laminated on both sides, or a layer of sheets 03 that is laminated on only one of the two sides, or an overlap area of two sheets 03 that is laminated on only one side, or an overlap area of two sheets 03 that is laminated on both sides. The connection of a web of laminating material 321; 331 that is running out to a new web of laminating material 321; 331 to be unwound results in a connection point, in particular a splice. This connection point is typically thicker than a plain web of laminating material 321; 331. The connection point extends along the designated transport path, for example over at least 6 mm, preferably over at least 10 mm, more preferably over at least 20 mm and even more preferably over at least 30 mm. Independently thereof, the connection point extends along the designated transport path, for example over at most 300 mm, preferably over at most 200 mm, more preferably over at most 100 mm and even more preferably over at most 50 mm. More particularly, in the case of two-sided lamination, a connection point may be created on an upper web of laminating material 321 and/or on a lower web of laminating material 331. Thus, the aforementioned possible layerings may each be modified by one or two connection points rather than simple layers of laminating material 321; 331.

Alternatively or additionally, laminating machine 01 is preferably characterized in that thickness monitoring device 354 is at least embodied to distinguish between an expected thickness of laminated material web 02 and an increased thickness. The expected thickness is, for example, the sum of the thickness of a sheet plus the combined thickness of two webs of laminating material 321; 331. This thickness represents the intended thickness of sections 04 and, during normal operation, also corresponds to the thickness of this material web 02 over a large part of the length of material web 02, for example over at least 75% or preferably at least 90% of its length. More particularly, when at least one lamination monitoring device 348; 349 is provided, as described, primarily those cases in which the thickness is greater than expected are of interest. These are essentially a first case, in which an overlap area passes through the monitoring zone of the thickness monitoring device 354, or a second case, in which at least one connection point passes through the monitoring zone of the thickness monitoring device 354, or a third case, in which both an overlap area and at the same time at least one connection point pass through the monitoring zone of thickness monitoring device 354.

The overlap length, i.e. in particular the overlap length of adjacent sheets 03, is the length, measured along the designated transport path of material web 02, over which adjacent sheets 03 touch one another within the laminated material web 02.

A thickness signal is preferably a signal that characterizes a thickness that is increased beyond the expected thickness of the laminated material web 02. In the first case, the region, measured along the designated transport path, over which at least one thickness signal is generated extends substantially over the overlap area, i.e. the overlap length. In the second case, the region, measured along the designated transport path, over which at least one thickness signal is generated extends substantially over the connection point. In the third case, the region, measured along the designated transport path, over which at least one thickness signal is generated likewise extends substantially over the connection point or is even longer, depending on the relative position of overlap area and connection point. The length of the region, measured along the designated transport path, over which at least one thickness signal is generated is calculated based upon the duration of the thickness signal and the transport speed of material web 02, for example. Preferably however, the length of the region, measured along the designated transport path, over which at least one thickness signal is generated is calculated from an angle traversed by a transport roller 311; 312; 341; 353; 407; 408; 429 provided for transporting the laminated material web 02 and the radius thereof. As such a transport roller 311; 312; 341; 353; 407; 408; 429 serves, for example, the first laminating roller 311 and/or the second laminating roller 312 and/or the at least one cooling roller 341 and/or the at least one web deflecting roller 353 and/or the at least one forward pressing roller 407 or intake pressing roller 407 and/or the at least one forward draw roller 408 or intake draw roller 408 and/or the at least one separation feed roller 429.

Alternatively or additionally, laminating machine 01 is preferably characterized in that laminating machine 01 comprises the machine controller, and in that the at least one thickness monitoring device 354 is connected in terms of circuitry to the machine controller of laminating machine 01. More preferably, laminating machine 01 is alternatively or additionally characterized in that laminating machine 01 has at least one transport roller 311; 312; 341; 353; 407; 408; 429 provided for transporting the laminated material web 02, and in that at least one angular position monitoring device is provided, by means of which the angular position of the transport roller 311; 312; 341; 353; 407; 408; 429 with respect to the rotational axis of the transport roller 311; 312; 341; 353; 407; 408; 429 can be detected, in particular directly or indirectly. The at least one angular position monitoring device is preferably connected in terms of circuitry to the machine controller of laminating machine 01. The at least one angular position monitoring device is embodied, for example, as part of the drive of transport roller 311; 312; 341; 353; 407; 408; 429 and/or as an additional sensor, in particular a rotary encoder.

Alternatively or additionally, laminating machine 01 is preferably characterized in that at least one drive of the at least one shingling unit 200; 206; 207; 208 is connected in terms of circuitry to the machine controller of laminating machine 01. This enables the determination, for example, of a time window and/or a location window in which an overlap area is expected at the location of thickness monitoring device 354, in particular during which the time and the location in which shingling will take place or has taken place is taken into account. Thus, when a thickness signal is generated, it can be determined whether an overlap area should be present at that location.

If no overlap area should be present at that location, the thickness signal is coming from a connection point. This can be verified based upon the length of the region associated with the thickness signal. If only one connection point is present, and thus in the second case, the sheet associated with said connection point is preferably sorted out, for example by means of the multiple sheet delivery unit.

If an overlap area should be present at that location, the thickness signal is coming from simply the overlap area or from a combination of overlap area and connection point. This can be verified based upon the length of the region associated with the thickness signal. If a connection point is present, it is likewise present in the overlap area. This is the third case. At such a site or connection point, the separation of a section 04 from material web 02 is risky or impossible. As a consequence, the transport of laminated material web 02 is preferably halted in such a way that said connection point lies in a location that is accessible to operators and can be removed manually. In contrast, if no connection point is present, the overlap length can be deduced from the length of the area associated with the thickness signal. If the overlap length deviates too much from a setpoint value, shingling unit 200; 206; 207; 208 is preferably adjusted to improve subsequent overlaps.

Alternatively or additionally, laminating machine 01 is preferably characterized in that the at least one thickness monitoring device 354 is connected in terms of circuitry to the machine controller of laminating machine 01 in such a way that the control and/or regulation of the at least one drive of shingling unit 200; 206; 207; 208 can be influenced by means of signals originating from the thickness monitoring device 354. In this way, shingling unit 200; 206; 207; 208 can be regulated in terms of the overlap length.

Alternatively or additionally, laminating machine 01 is preferably characterized in that laminating machine 01 comprises the at least one separating device 400 for separating sections 04 from the laminated material web 02, downstream of the at least one laminating unit 310 and more preferably also downstream of the at least one overlap sensor 354 along the transport path designated for the laminated material web 02. More preferably, laminating machine 01 is alternatively or additionally characterized in that at least one drive of the at least one separating device 400 is connected in terms of circuitry to the machine controller of laminating machine 01, and in that the at least one thickness monitoring device 354 is connected in terms of circuitry to the machine controller of laminating machine 01 in such a way that the control and/or regulation of the at least one drive of the at least one separating device 400 can be influenced by means of signals originating from the thickness monitoring device 354.

More preferably, laminating machine 01 is alternatively or additionally characterized in that at least one drive provided for transporting the laminated material web 02 is connected in terms of circuitry to the machine controller of laminating machine 01, and in that the at least one thickness monitoring device 354 is connected in terms of circuitry to the machine controller of laminating machine 01 in such a way that the control and/or regulation of the at least one drive provided for transporting the laminated material web 02 can be influenced by means of signals originating from the thickness monitoring device 354.

Then, when a simple overlap area is present, i.e. in the first case, it can be verified whether the position of the overlap area and the timing of the separating device 400 are coordinated in such a way that a separation can be carried out successfully. Otherwise, corrective action can be taken by accelerating and/or decelerating the material web 02 and/or by modifying the actuation of stretching elements 403; 412; 413.

Alternatively or in addition to processes already described above, the method for laminating sheets 03 of a material 02 by means of a laminating machine 01 is preferably characterized in that the sheets 03 are first separated from one another spatially by means of a singulating unit 200; 202, and/or in that the sheets 03 are aligned, and/or in that the sheets 03, in particular following their spatial separation, are moved by means of a shingling unit 200; 206; 207; 208 into a position in which they overlap only partially with one another. Alternatively or additionally, the method is preferably characterized in that the sheets 03 are fed to the laminating unit 310 of laminating machine 01, where they are laminated in the mutually overlapping position by bonding to at least one web-type laminating material 321; 331, in particular, and are joined to form a laminated material web 02.

Alternatively or additionally, the method is preferably characterized in that the thickness of laminated material web 02 is monitored by means of at least one thickness monitoring device 354, and in that if the thickness of laminated material web 02 is greater than the expected thickness, the thickness monitoring device 354 will send at least one thickness signal or multiple thickness signals characterizing this greater than expected thickness of laminated material web 02 to a machine controller of laminating machine 01.

Alternatively or additionally, the method is preferably characterized in that the laminated material web 02 is divided into sections 04 by means of separating device 400 of laminating machine 01, and in that separation signals are signals that characterize the movement of at least one drive of separating device 400. The separation signals are preferably conducted at least to the machine controller of laminating machine 01. More preferably, a joint evaluation of separation signals and thickness signals is preferably carried out, in particular by means of the machine controller of laminating machine 01. Each separation signal characterizes, for example, the position of a stretching element 403; 412; 413, in particular independently of separations that actually occur.

Alternatively or additionally, the method is preferably characterized in that if the relative sequence of separation signals and thickness signals deviates from the expected target sequence, the transport speed of the laminated material web 02 will be at least temporarily altered, in particular based upon the relative sequence of separation signals and thickness signals that deviates from the expected target sequence. If necessary, further adjustments are then made, for example with respect to the drives of sheet feeder 100 and/or of shingling unit 200; 206; 207; 208.

Alternatively or additionally, the method is preferably characterized in that if the relative sequence of separation signals and thickness signals deviates from an expected target sequence, the regulation of at least one drive of separating device 400 will be adjusted, taking this deviation into account. In that case the transport of material web 02 can be influenced less or not influenced at all, and instead the movement of stretching elements 403; 412; 413 may be adjusted thereto.

Alternatively or additionally, the method is preferably characterized in that a respective overlap length is calculated on the basis of at least one thickness signal or more preferably on the basis of each thickness signal. More preferably, the method is alternatively or additionally characterized in that the respective overlap length is compared with at least one shingling reference value and, on the basis of this comparison, the regulation of at least one drive of shingling unit 200; 206; 207; 208 is adjusted, and/or in that the respective overlap length is compared with at least one connection reference value and, on the basis of this comparison, a section 03 later separated from material web 02 is ejected and/or the transport speed of laminated material web 02 is reduced, in particular to a full stop of material web 02, preferably within a preselected position range.

As described above, the method is preferably alternatively or additionally characterized in that the at least one laminating material 321; 331 is wound off of at least one roll in a lamination source 320; 330 embodied as roll unwinding device 320; 330 and/or as reel changer 320; 330.

Alternatively or additionally, the machine controller is preferably equipped with an electronic master axis and, in particular at all times, with information regarding the precise location of sheets 03 and/or sections 04 and/or the time at which sheets 03 and/or sections 04 are to arrive at a specific location. The at least one overlap monitoring device can then detect the arrival of a sheet 03 and/or 04 section within its monitoring zone. If deviations from scenarios resulting from the calculated data of the machine controller occur, a corresponding conclusion is preferably drawn, for example at least one drive is adjusted and/or at least one error message is generated and/or processing machine 01 is at least partially and preferably completely stopped.

At least one inspection system is provided, for example, which checks incoming sheets 03 for their prior processing and/or which checks outgoing sections 04 for their processing.

Sheets 03 are preferably security sheets 03 and/or banknote sheets 03. Sections 04 are preferably security sections 04 and/or banknote sections 04. Preferably, each sheet 03 bears multiple copies of printed material, in particular multiple copies of securities and/or multiple copies of banknotes. Preferably, each section 04 bears multiple copies of printed material, in particular multiple copies of securities and/or multiple copies of banknotes. Preferably, material web 02 bears multiple copies of printed material, in particular multiple copies of securities and/or multiple copies of banknotes.

In the case of sheets 03 of different lengths, the movement sequences of the components involved in the transport of sheets 03 and of material web 02 and of sections 04 is adjusted, for example. Examples of such components include preparation unit 200 and/or singulating unit 200 and/or alignment unit 200 and/or shingling unit 200 and/or under-shingling unit 200 and/or sheet infeed 200 and/or stop drum 201 or suction drum 201 and/or suction drum 202 or acceleration drum 202 and/or suction belt 204 and/or underfeed drum 206 and/or lifting device 207; 208 or blower nozzle 207 or clapper roller 207 or suction device 208 or suction nozzle 208 and/or the first stretching element 403 and/or the second stretching element 412 and/or the third stretching element 413. For this purpose, the length of sheet 03 may be entered manually, measured by a sensor or queried from order data. Suitable movement sequences are then chosen from a predefined selection and/or are recalculated. For sheets 03 of different widths, zones of suction devices or blower devices may be switched off, for example.

While preferred embodiments of a separating device for separating sections from a material web, a laminating machine comprising a separating device, and a method for laminating a sheet of a material and for separating at least one material section from a material web, all in accordance with the present invention, have been set forth fully and completely hereinabove, it will be apparent to one of skill in the art that various changes could be made without departing from the true spirit and scope of the present invention, which is accordingly to be limited only by the appended claims.

The invention claimed is:

1. A separating device for separating sections from a material web, the separating device comprising:
 at least one forward clamping device, with at least one forward clamping point, and at least one rear clamping device, with at least one rear clamping point;
 at least one first stretching element wherein, by moving at least the at least one first stretching element between at least one first traversing position and at least one first separation position, the separating device can be switched between at least one first traversing mode and at least one separation mode,
 a traversing mode transport line forming a shortest connection between the at least one forward clamping point and the at least one rear clamping point, said shortest connection lying entirely within a vertical reference plane and one of traversing and forming a tangent to any component of the separating device on a respective same side as a transport path provided for the one of the material web and the sections;

a first reference plane and a second reference plane arranged spaced from one another in an axial direction and, when the at least one first stretching element is disposed in the at least one first separation position, a first separation mode transport line lying in the first reference plane and a second separation mode transport line lying in the second reference plane have first and second lengths different from each other, wherein in the at least one separation mode, each separation mode transport line is at least 2 mm longer than in the traversing mode transport line, and wherein, in the at least one separation mode, each of the transport lines has a minimum radius of curvature of at least 0.05 mm, and wherein the at least one first stretching element is arranged to one of pivot and rotate eccentrically about a first stretching axis, which first stretching axis is oriented parallel to the axial direction.

2. The separating device according to claim 1, wherein the separating device has at least one second stretching element, which is movable between a second traversing position and a second separation position, and wherein the separating device has at least one third stretching element, which is movable between a third traversing position and a third separation position, and wherein, when the first stretching element is in the first separation position, and the second stretching element is in the second separation position, and the third stretching element is in the third separation position, at least one rectilinear connection between the at least one second stretching element and the at least one third stretching element intersects the at least one first stretching element.

3. The separating device according to claim 1, wherein each contact line of the at least one first stretching element, said contact line lying in one of the first reference plane, the second reference plane and the first reference place and intended for contact with the material web, has a minimum radius of at least 0.05 mm.

4. A separating device for separating sections from a material web, the separating device comprising:
   at least one forward clamping device, with at least one forward clamping point, and at least one rear clamping device, with at least one rear clamping point;
   at least one first stretching element wherein, by moving at least the at least one first stretching element between at least one first traversing position and at least one first separation position, the separating device can be switched between at least one first traversing mode and at least one separation mode;
   a traversing mode transport line forming a shortest connection between the at least one forward clamping point and the at least one rear clamping point, said shortest connection lying entirely within a vertical reference plane and one of traversing and forming a tangent to any component of the separating device on a respective same side as a transport path provided for the one of the material web and the sections, wherein in the at least one separation mode, a separation mode transport line is at least 2 mm longer than in the at least one first traversing mode;
   at least one second stretching element, which is movable between a second traversing position and a second separation position;
   at least one third stretching element, which is movable between a third traversing position and a third separation position, wherein, when the first stretching element is in the first separation position, and the second stretching element is in the second separation position, and the third stretching element is in the third separation position, at least one rectilinear connection between the at least one second stretching element and the at least one third stretching element intersects the at least one first stretching element, and further wherein, in the at least one separation mode, the separation mode transport line has a minimum radius of curvature of at least 0.05 mm; and
   one of wherein the at least one first stretching element is arranged to one of pivot and rotate eccentrically about a first stretching axis, wherein the at least one second stretching element is arranged to one of pivot and rotate eccentrically about a second stretching axis, and wherein the at least one third stretching element is arranged to one of pivot and rotate eccentrically about a third stretching axis.

5. A separating device for separating sections from a material web, the separating device comprising:
   at least one forward clamping device, with at least one forward clamping point, and at least one rear clamping device, with at least one rear clamping point;
   at least one first stretching element wherein, by moving at least the at least one first stretching element between at least one first traversing position and at least one first separation position, the separating device can be switched between at least one first traversing mode and at least one separation mode;
   a traversing mode transport line forming a shortest connection between the at least one forward clamping point and the at least one rear clamping point, said shortest connection lying entirely within a vertical reference plane and one of traversing and forming a tangent to any component of the separating device on a respective same side as a transport path provided for the one of the material web and the sections, wherein in the at least one separation mode, a separation mode transport line is at least 2 mm longer than in the at least one first traversing mode;
   at least one second stretching element, which is movable between a second traversing position and a second separation position;
   at least one third stretching element, which is movable between a third traversing position and a third separation position, wherein, when the first stretching element is in the first separation position, and the second stretching element is in the second separation position, and the third stretching element is in the third separation position, at least one rectilinear connection between the at least one second stretching element and the at least one third stretching element intersects the at least one first stretching element, and further wherein, in the at least one separation mode, the separation mode transport line has a minimum radius of curvature of at least 0.05 mm; and
   at least one belt guidance system, which comprises a plurality of conveyor belts arranged one behind the other in an axial direction and with intermediate spaces therebetween in this axial direction, and wherein one of the at least one second stretching element, in its second separation position, and the at least one third stretching element, in its third separation position, is arranged at least partially protruding through the intermediate spaces.

\* \* \* \* \*